(12) United States Patent
Fujishima

(10) Patent No.: US 9,705,445 B2
(45) Date of Patent: Jul. 11, 2017

(54) APPARATUS FOR CONTROLLING ALTERNATING-CURRENT ROTARY ELECTRIC MACHINES

(71) Applicant: DENSO CORPORATION, Kariya, Aichi-pref. (JP)

(72) Inventor: Yuya Fujishima, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/229,328

(22) Filed: Aug. 5, 2016

(65) Prior Publication Data

US 2017/0040922 A1 Feb. 9, 2017

(30) Foreign Application Priority Data

Aug. 7, 2015 (JP) .................. 2015-157035

(51) Int. Cl.
| | |
|---|---|
| H02P 6/00 | (2016.01) |
| H02P 6/12 | (2006.01) |
| H02P 21/00 | (2016.01) |
| H02P 27/08 | (2006.01) |
| H02P 21/22 | (2016.01) |

(52) U.S. Cl.
CPC .......... *H02P 27/08* (2013.01); *H02P 21/0003* (2013.01); *H02P 21/22* (2016.02)

(58) Field of Classification Search
CPC .......... H02P 21/22; H02P 21/14; H02P 27/06; H02P 27/085; H02P 29/027; H02P 6/12; H02P 21/05; H02P 21/06; H02P 21/141; H02P 21/20; H02P 21/28; H02P 2207/05; H02P 2209/13; H02P 29/50; Y02T 10/643

USPC .... 318/139, 400.02, 400.22, 400.15, 400.25, 318/490
See application file for complete search history.

(56) References Cited

U.S. PATENT DOCUMENTS

| | | | | |
|---|---|---|---|---|
| 7,554,281 | B2* | 6/2009 | Satake | B60L 11/1803 318/400.15 |
| 9,154,064 | B2* | 10/2015 | Suzuki | H02P 29/027 |
| 2008/0191656 | A1* | 8/2008 | Satake | B60L 11/1803 318/722 |
| 2011/0031907 | A1* | 2/2011 | Takahashi | H02P 21/141 318/139 |
| 2014/0091743 | A1* | 4/2014 | Suzuki | H02P 29/027 318/400.22 |

(Continued)

FOREIGN PATENT DOCUMENTS

JP 2015-027136 A 2/2015

*Primary Examiner* — Paul Ip
(74) *Attorney, Agent, or Firm* — Oliff PLC

(57) ABSTRACT

In an apparatus, a combination unit selects one of three-phase currents flowing in a three-phase alternating-current rotary electric machine. The combination unit shifts the captured values of at least one of the remaining two phase currents other than the reference phase current by 120 electrical degrees. The combination unit combines the shifted captured values of the at least one of the remaining two phase currents to the captured values of the reference phase current to obtain combined values of the reference phase current. A coefficient calculator integrates, for each of the calculation angles, function values based on the combined values of the reference phase current over the at least one period of the electrical angle of the three-phase rotary electric machine to calculate a Fourier coefficient for the reference phase current.

9 Claims, 9 Drawing Sheets

(56) References Cited

U.S. PATENT DOCUMENTS

| | | | | |
|---|---|---|---|---|
| 2014/0152205 A1* | 6/2014 | Nakai | ..................... | H02P 21/22 318/400.02 |
| 2015/0229247 A1* | 8/2015 | Nakai | ..................... | H02P 21/06 318/400.02 |
| 2015/0365040 A1* | 12/2015 | Saha | ........................ | B60L 1/00 318/400.25 |

* cited by examiner

FIG.2

| FEEDBACK CONTROL | CURRENT-FEEDBACK CONTROL | | TORQUE-FEEDBACK CONTROL |
|---|---|---|---|
| CONTROL MODE | SINE PWM CONTROL MODE | OVER-MODULATION CONTROL MODE | RECTANGULAR CONTROL MODE |
| OUTPUT-VOLTAGE WAVEFORM OF INVERTER | FUNDAMENTAL COMPONENT | FUNDAMENTAL COMPONENT | FUNDAMENTAL COMPONENT |
| MODULATION FACTOR m | 0~1.27 | | 1.27 |
| CHARACTERISTICS | REDUCE TORQUE VARIATIONS | IMPROVE MOTOR OUTPUT FOR MIDDLE-SPEED RANGE | IMPROVE MOTOR OUTPUT FOR HIGH-SPEED RANGE |

FIG.3

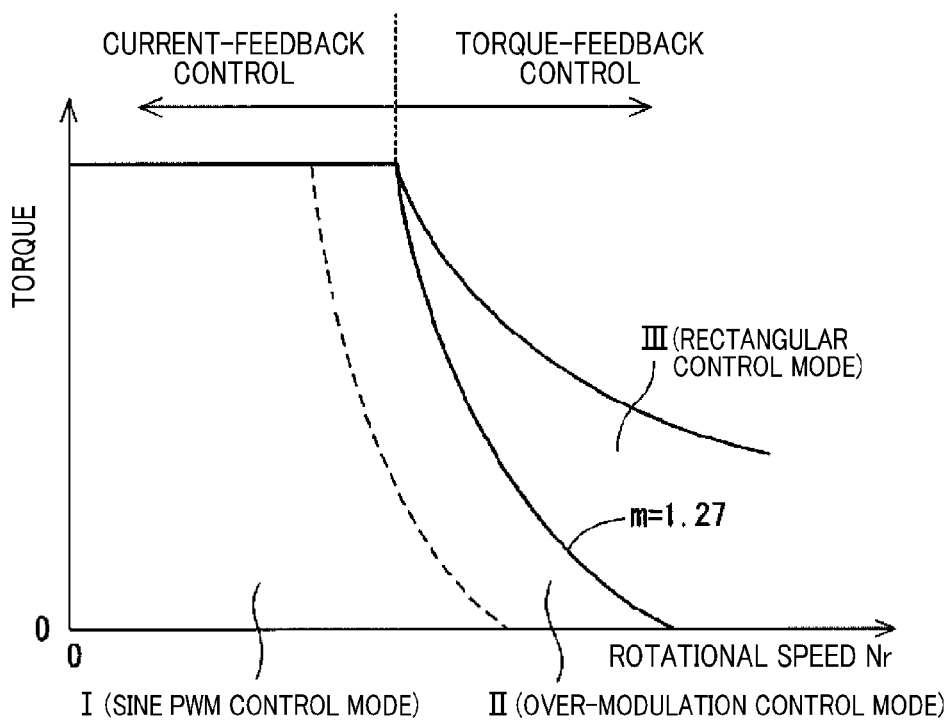

ONE PERIOD OF ELECTRICAL ANGLE (360 ELECTRICAL DEGREES)

COMBINED SAMPLING POINTS
FOR U-, V-, AND W-PHASE CURRENTS

SAMPLING POINTS BASED ON
SAMPLING INTERVALS OF 36 ELECTRICAL DEGREES

| V-PHASE (°) | W-PHASE (°) | U-PHASE (°) |
|---|---|---|
| 0 | 120 | 240 |
| 36 | 156 | 276 |
| 72 | 192 | 312 |
| 108 | 228 | 348 |
| 144 | 264 | 24 |
| 180 | 300 | 60 |
| 216 | 336 | 96 |
| 252 | 12 | 132 |
| 288 | 48 | 168 |
| 324 | 84 | 204 |

APPARATUS FOR CONTROLLING ALTERNATING-CURRENT ROTARY ELECTRIC MACHINES

CROSS REFERENCE TO RELATED APPLICATIONS

This application is based on and claims the benefit of priority from Japanese Patent Application 2015-157035 filed on Aug. 7, 2015, the disclosure of which is incorporated in its entirety herein by reference.

TECHNICAL FIELD

The present disclosure relates to apparatuses for controlling an alternating-current (AC) rotary electric machine.

BACKGROUND

Typical control methods for AC rotary electric machines obtain a value of each phase current flowing in an AC rotary electric machine. Then, the typical control methods send driving instructions to switching elements of an inverter for the respective phases of the AC rotary electric machine. This controls the switching elements to perform feedback control of a controlled variable accordingly; the controlled variable depends on the obtained value of each phase current. This feedback control results in an actual value of the controlled variable following a target value of the controlled variable.

Superimposition of harmonics, i.e. higher-order components, on at least one phase current flowing in an AC rotary electric machine during execution of such feedback control causes harmonics to be superimposed on the driving instructions for the respective switching elements of the inverter. This may result in harmonics being contained in, for example, switching noise of the inverter, resulting in greater noise.

Superimposition of harmonics on at least one phase current flowing in an AC rotary electric machine during execution of such feedback control also causes a problem of phase-current offset. The following describes the phase-current offset. Specifically, a reference level of 0 [A] for each phase current is learned based on a level of a corresponding phase current at the start-up of the AC rotary electric machine. However, the middle point of the peak-to-peak amplitude of at least one phase current is offset with respect to the reference level of 0 [A], which will be expressed as phase-current offset.

Phase-current offset occurring in at least one phase current may cause torque variations and/or power fluctuation of the AC rotary electric machine.

A known control apparatus for an AC rotary electric machine, which is disclosed in Japanese Patent Application Publication No. 2014-132815 to address the above problems, performs Fourier series expansion of measured values of, for example, first and second phase currents as a function of electrical rotational angle $\theta$ of a rotor of the AC rotary electric machine.

This Fourier series expansion calculates a pair of first-order Fourier coefficients for each of the first and second phase currents, and obtains, based on the pair of first-order Fourier coefficients for each of the first and second phase currents, a first-order component of a corresponding one of the first and second phase currents. Values of the first-order component of each of the first and second currents are a function of the electrical rotational angle $\theta$ of the rotor of the AC rotary electric machine.

Then, the known control apparatus performs, using the first-order component of each of the first and second phase currents, feedback control of the controlled variable to cause the actual value of the controlled variable to follow a target value of the controlled variable.

Specifically, the known control apparatus divides k period(s) of the electrical rotational angle $\theta$ of the rotor by N to obtain N integration angles where k is a positive integer variable equal to or larger than 1, and N is a positive integer variable. Then, the known control apparatus integrates values calculated based on values of the first phase current measured at the respective N integration angles over the k periods; the measured values of the first phase current are a function of the electrical rotational angle $\theta$ of the rotor. This calculates the pair of first-order Fourier coefficients for the first phase current.

Similarly, the known control apparatus integrates values calculated based on values of the second phase current measured at the respective N integration angles over the k periods; the measured values of the second phase current are a function of the electrical rotational angle $\theta$ of the rotor. This calculates the pair of first-order Fourier coefficients for the second phase current.

SUMMARY

Increasing the number N by which the k period(s) of the electrical rotational angle $\theta$ of the rotor is divided improves the accuracy of calculating the first-order component of each of the first and second currents, which is expressed as a function of the electrical rotational angle $\theta$ of the rotor. Unfortunately, there is a limit of the processing capacity of the control apparatus, and this may result in a predetermined upper limit to the number N used to divide the k period(s) of the electrical rotational angle $\theta$ of the rotor. If the number N were increased over the upper limit thereto, before the present calculation process for the pair of first-order Fourier coefficients of each of the first and second phase currents is terminated, the next calculation process for the pair of first-order Fourier coefficients of each of the first and second phase currents might be started. This might result in difficulty of improvement of the calculation accuracy of the first-order component of each of the first and second currents even an increase of the number N over its upper limit.

In view of the circumstances set forth above, one aspect of the present disclosure seeks to provide such control apparatuses, each of which is capable of improving the calculation accuracy of a first-order component of at least first and second phase currents flowing in a rotary electric machine.

According to an exemplary aspect of the present disclosure, there is provided an apparatus for controlling switching elements of an inverter to control a three-phase alternating-current rotary electric machine in accordance with measured values of at least first and second phase currents in three-phase currents flowing in the alternating-current rotary electric machine. The apparatus includes an obtaining unit configured to obtain a value of each phase current based on the measured values of the at least first and second phase currents for each calculation angle of the alternating-current rotary electric machine. The calculation angles have intervals therebetween. The apparatus includes an interval setter configured to set each of the intervals between the calculation angles to an electrical angle. The electrical angle is a submultiple of (k×360) electrical degrees and is unequal to a submultiple of 120 electrical degrees for at least one period of the electrical angle of the three-phase rotary electric machine where k represents the number of the at least one period and is a positive integer variable. The apparatus includes a combination unit configured to select one of the three-phase currents as a reference phase current, and shift the captured values of at least one of the remaining two phase currents other than the reference phase current by 120 electrical degrees. The combination unit is also configured to combine the shifted captured values of the at least one of the remaining two phase currents to the captured values of the reference phase current to obtain combined values of the reference phase current. The apparatus includes a coefficient calculator configured to integrate, for each of the calculation angles, function values based on the combined values of the reference phase current over the at least one period of the electrical angle of the three-phase rotary electric machine to calculate a Fourier coefficient for the reference phase current. The apparatus includes a first-order current calculator configured to calculate a first-order component of each phase current based on the calculated Fourier coefficient. The apparatus includes a dq-axis current converter configured to convert the first-order currents of the respective phase currents into d-axis current value and a q-axis current value. The apparatus includes a driver configured to drive the switching elements of the inverter such that a value of a controlled variable based on the calculated d- and q-axis current values follows a target value of the controlled variable.

The apparatus according to the exemplary aspect enables the number of combined values of the reference phase current used to calculate the Fourier coefficient to be greater than the number of original values of the reference phase current obtained by a comparison example that uses merely the original values of the reference phase current while maintaining the calculation cycle of the Fourier coefficient unchanged.

This therefore efficiently improves the calculation accuracy of the first-order component of each phase current even if there is a limit of the processing capacity of the apparatus.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which:

FIG. 2 is a table schematically illustrating control modes used for a control apparatus for controlling a motor-generator illustrated in FIG. 1, and characteristics of the respective control modes;

FIG. 3 is a graph schematically illustrating a relationship between the control modes including corresponding feedback control methods and operating characteristics of a motor-generator the motor-generator;

DETAILED DESCRIPTION OF EMBODIMENT

Figure 1:
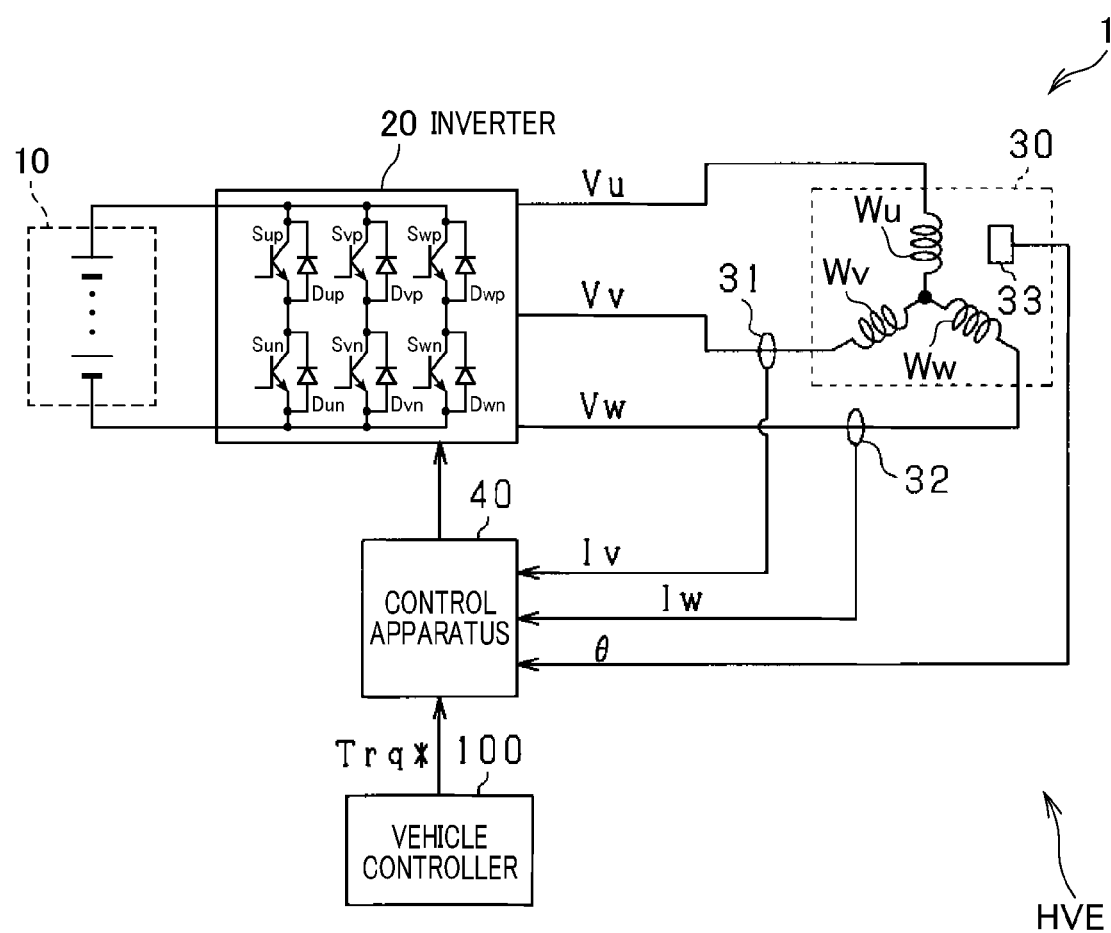
FIG. 1 is a circuit diagram schematically illustrating an example of the circuit structure of a motor-generator system according to an exemplary embodiment of the present disclosure.

The following describes a control apparatus 40 for AC rotary electric machines according to an exemplary embodiment of the present disclosure with reference to the accompanying drawings. In the drawings, identical reference characters are utilized to identify identical corresponding components.

For example, the control apparatus 40 according to the exemplary embodiment is applied for a motor-generator system 1 for driving a hybrid vehicle VE as an example.

Referring to FIG. 1, the motor-generator system 1 installed in the hybrid vehicle HVE includes a motor-generator 30 as an example of rotary electric machines, an inverter 20, a direct-current (DC) power source 10, current sensors 31 and 32, a rotational position sensor 33, and the control apparatus 40. To the control apparatus 40, a vehicle controller 100 is communicably connected. The vehicle controller 100 detect the driving conditions of the hybrid vehicle HVE based on, for example, measurement values sent from various sensors installed in the hybrid vehicle HVE. Then, the vehicle controller 100 generates a value of request torque Trq* according to the detected driving conditions of the hybrid vehicle HVE, and outputs the value of the torque request Trq* to the control apparatus 40.

The motor-generator 30 is provided with a rotor 30a and a stator (not shown). The motor-generator 30 serves as a driving source for the hybrid vehicle HVE.

The rotor is operative to generate field magnetic flux. The has a direct axis (d-axis) in line with a direction of the field magnetic flux generated thereby, and also has a quadrature axis (q-axis) with a phase being π/2-radian electric angle leading with respect to the d-axis during rotation of the rotor. In other words, the q-axis is electromagnetically orthogonal to the d-axis.

The d and q axes constitute a d-q coordinate system, i.e. a two-phase rotating coordinate system, defined relative to the rotor.

The stator includes a stator core such that the rotor is rotatably arranged with respect to the stator core. The stator also includes a set of three-phase windings, i.e. armature windings, wound in the stator core.

The three-phase, i.e. U-, V, and W-phase, windings Wu, Wv, and Ww are wound in the stator core such that the U-, V-, and W-phase windings Wu, Wv, and Ww are shifted by an electrical angle of, for example, 2π/3 radian in phase from each other.

For example, the three-phase windings Wu, Wv, and Ww each have one end connected to a common junction, i.e. a neutral point, and the other end to a separate terminal in, for example, a star-configuration. The stator has a three-phase fixed coordinate system having fixed three axes corresponding to the respective three-phase windings Wu, Wv, and Ww.

Specifically, the motor-generator 30 serves as a motor to generate torque for rotatably driving the driving wheels of the hybrid vehicle HVE. The motor-generator 30 also serves as a generator driven based on torque supplied from the internal combustion engine of the hybrid vehicle HVE and/or the driving wheels, thus generating electrical power.

The inverter 20 is designed as a three-phase inverter. The inverter 20 is provided with a first pair of series-connected high- and low-side (upper- and lower-arm) switching elements Sup and Sun, a second pair of series-connected high- and low-side switching elements Svp and Svn, and a third pair of series-connected high- and low-side switching elements Swp and Swn. The inverter 20 is also provided with flywheel diodes Dup, Dun, Dvp, Dvn, Dwp, and Dwn electrically connected in antiparallel to the respective switching elements Sup, Sun, Svp, Svn, Swp, and Swn.

The first to third pairs of switching elements are parallely connected to each other in bridge configuration.

As the switching elements S*# (*=u, v, and w, and #=p and n), IGBTs or MOSFETS can be respectively used. When MOSFETs are used as the switching elements S*#, intrinsic diodes of the power MOSFETs can be used as the flywheel diodes, thus eliminating the need for external flywheel diodes.

A connecting point, through which the switching elements Sup and Sun of the first pair are connected to each other in series, is connected to an output lead extending from the separate terminal of the U-phase winding Wu. Similarly, a connecting point, through which the switching elements Svp and Svn of the second pair are connected to each other in series, is connected to an output lead extending from the separate end of the V-phase winding Wv. Moreover, a connecting point, through which the switching elements Swp and Swn of the third pair are connected to each other in series, is connected to an output lead extending from the separate end of the W-phase winding Ww.

One end of the series-connected switching elements of each of the first, second, and third pairs is connected to the positive terminal of the DC power source 10 via a positive terminal of the inverter 20. The other end of the series-connected switching elements of each of the first, second, and third pairs is connected to the negative terminal of the DC power source 10 via a negative terminal of the inverter 20. Each of the switching elements S*# has a control terminal connected to the control apparatus 40.

Driving signals gup, gun, gvp, gvn, gwp, and gwn sent from the control apparatus 40 described later are input to the gates of the respective switching elements Sup, Sun, Svp, Svn, Swp, and Swn. This controls on and off operations of the switching elements Sup, Sun, Svp, Svn, Swp, and Swn, thus converting DC power, i.e. a DC voltage, supplied from the DC power source 10 into controlled AC power, i.e. controlled three-phase AC voltages Vu, Vv, and Vw. The controlled three-phase AC voltages Vu, Vv, and Vw are applied to the respective three-phase windings Wu, Wv, and Ww, thus controllably driving the motor-generator 30.

The DC power source 10 is an electrical storage device for charging power thereinto and discharging power therefrom. A secondary battery, such as a nickel-hydrogen battery or a lithium-ion rechargeable battery, or an electrical double layer capacitor can be used as the DC power source 10. The DC power source 10 is connected to the control apparatus 10 via the inverter 20. The DC power source 10 is configured to transfer electrical power therefrom to the motor-generator 30 via the inverter 20, and receive electrical power transferred from the motor-generator 30 via the inverter 20. Specifically, the DC power source 10 outputs a DC voltage to be input to the inverter 20 as a system voltage VH. If a booster converter is connected between the DC power source and the inverter 20, the DC voltage output from the DC power source 10 is boosted by the booster converter, and the boosted DC voltage is input to the inverter 20 as the system voltage VH.

The current sensor 31 is provided to, for example, the output lead extending from the separate terminal of the V-phase winding Wv. The current sensor 31 is operative to periodically measure a value of a V-phase current Iv flowing through the V-phase winding Wv. The current sensor 31 is also operative to periodically send a signal indicative of a corresponding measured value of the V-phase current Iv to the control apparatus 40. Similarly, the current sensor 32 is provided to, for example, the output lead extending from the separate terminal of the W-phase winding Ww. The current sensor 32 is operative to periodically measure a value of a W-phase current Iw flowing through the W-phase winding Ww. The current sensor 32 is also operative to periodically send a signal indicative of a corresponding measured value of the W-phase current Iw to the control apparatus 40. The measurement and output period of the current sensor 31 are the same as the measurement and output period of the current sensor 32.

The sum of a U-phase current Iu flowing through the U-phase winding Wu, the V-phase current Iv, and the W-phase current Iw is always zero from Kirchhoff's law. That is, the control apparatus 40 periodically calculates a value of the U-phase current Iu based on corresponding measured values of the V- and W-phase currents Iv and Iw each time the signals each indicative of a corresponding one of the measured values of the V- and W-phase currents Iv and Iw is input thereto.

The current sensors 31 and 32 can be provided to the output leads extending from the separate terminals of the respective U- and V-phase windings Wu and Wv or U- and W-phase windings Wu and Ww. In addition, three current sensors can be provided for the output leads extending from the separate terminals of the respective three-phase windings Wu, Wv, and Ww.

The rotational angle sensor 33 includes, for example, a resolver or an encoder. The rotational angle sensor 33 is disposed to be adjacent to the rotor of the motor-generator 30, and is connected to the control apparatus 40. The rotational angle sensor 33 is configured to measure, i.e. monitor, the rotational position θ of the rotor of the motor-generator 30 as an electrical rotational angel with respect to, for example, the U-phase axis of the three-phase fixed coordinate system. The rotational angle sensor 33 is also configured to output, to the control apparatus 40, the measured rotational position θ of the rotor of the motor-generator 30. This permits the control apparatus 40 to calculate the rotational speed, referred to as Nr, of the rotor of the motor-generator 30 based on the rotational position θ.

The vehicle controller 100 is a higher level control apparatus than the control apparatus 40, and is operative to control the overall operations of the hybrid vehicle HVE. For example, the vehicle controller 100 is designed as, for example, a microcomputer circuit. Specifically, the vehicle controller 100 essentially includes, for example, a CPU, a memory, such as a ROM and/or a RAM, an input/output (I/O) unit, and a bus connecting between the CPU, memory, and I/O. The vehicle controller 100 can include at least one special-purpose electronic circuit. Specifically, the vehicle controller 100 is configured such that the CPU performs instructions of programs stored in the memory, thus performing predetermined software tasks associated with the overall operations of the hybrid vehicle HVE. The vehicle controller 100 can also be configured such that the at least one special-purpose electronic circuit performs predetermined hardware tasks associated with the overall operations of the hybrid vehicle HVE. The vehicle controller 100 can be configured to perform both the software tasks and the hardware tasks.

Various sensors and switches SS indicative of the driving conditions of the hybrid vehicle HVE are installed in the hybrid vehicle HVE. The sensors and switches SS include, for example, an accelerator sensor, a brake sensor, and a shift position sensor.

The accelerator sensor is operative to detect a position or stroke of a driver-operable accelerator pedal of the hybrid vehicle HVE, and output an accelerator signal indicative of the measured driver's operated position or stroke of the accelerator pedal to the vehicle controller 100.

The brake sensor is operative to, for example, detect whether a brake pedal of the hybrid vehicle HVE is operated, and output, to the vehicle controller 100, a brake signal when it is determined that the brake pedal is operated.

The shift position sensor is operative to detect a driver's selected position of a transmission installed in the hybrid vehicle HVE, and output a shift signal indicative of the driver's selected position to the vehicle controller 100.

The vehicle controller 100 is configured to receive the signals sent from the sensors and/or switches SS, and detect the driving conditions of the hybrid vehicle HVE based on the received signals. The vehicle controller 100 is also configured to generate a value of request torque Trq* according to the detected driving conditions of the hybrid vehicle HVE, and output the value of the torque request Trq* to the control apparatus 40.

For example, the control apparatus 40 is designed as, for example, a microcomputer circuit. Specifically, the control apparatus 40 essentially includes, for example, a CPU, a memory, such as a ROM and/or a RAM, an input/output (I/O) unit, and a bus connecting between the CPU, memory, and I/O. The control apparatus 40 can include at least one special-purpose electronic circuit. Specifically, the control apparatus 40 is configured such that the CPU performs instructions of programs stored in the memory to perform predetermined software tasks associated with the switching operations of the inverter 20, thus controlling how the motor-generator 30 is driven.

The control apparatus 40 can also be configured such that the at least one special-purpose electronic circuit performs predetermined hardware tasks associated with the switching operations of the inverter 20, thus controlling how the motor-generator 30 is driven. The control apparatus 40 can be configured to perform both the software tasks and the hardware tasks.

Next, the following describes control modes used by the control apparatus 40 for controlling the motor-generator 30 with reference to FIG. 2. A sinewave PWM control mode, an over-modulation control mode, i.e. over-modulation PWM control mode, and a rectangular control mode are examples of the control modes used by the control apparatus 40.

The control apparatus 40 is configured to select one of the three control modes according to a modulation factor m. The modulation factor m is defined as the following equation [1]:

$$m = 2\sqrt{\frac{2}{3}} \frac{Vr}{VH} \quad [1]$$

Where VH represents the system voltage input to the inverter 20, and Vr represents the magnitude of a voltage vector in the d-q coordinate system to be applied to the motor-generator 30.

Note that $$\frac{Vr}{VH}$$

represents a voltage utilization factor of the inverter 20.

When the modulation factor m is set to be greater than 0 and smaller than 1.27, the control apparatus 40 selects the sinewave PWM control mode or the over-modulation control mode.

In the sinusoidal PWM control mode, the control apparatus 40 performs a PWM control task. The PWM control task compares in amplitude each of three-phase sinewave command voltages with a carrier signal. Then, the PWM control task controls on and off operations of the switching elements S*# according to the compared results. Specifically, the PWM control task controls a duty, i.e. duty factor, representing a controllable ratio, i.e. percentage, of an on duration to a total duration of each switching cycle for each of the switching elements S*#. This PWM control changes on-pulse widths and off-pulse widths of the switching elements S# for each phase such that a fundamental component of an output voltage, i.e. a line-to-line voltage, of the inverter 12 has a pseudo sinusoidal waveform.

In the sinewave PWM control mode, the amplitude of each of the three-phase sinewave command voltages is limited to be within the range of the amplitude, i.e. the system voltage VH, of the carrier signal, so that, as described above, a line-to-line voltage output from the inverter 12 to be applied to the motor-generator 30 has a pseudo sinusoidal waveform.

In the over-modulation PWM control mode, the control apparatus 40 performs a PWM control task like the sinewave PWM control mode such that the amplitude of each of the three-phase sinusoidal command voltages is higher than the amplitude of the carrier signal. Particularly, in the over-modulation PWM control mode, the control apparatus 40 is capable of performing a voltage-amplitude correction that distorts each of the three-phase sinusoidal command voltages from a corresponding original sinusoidal waveform. This makes it possible to increase the amplitude of the fundamental component of the output voltage of the inverter 20. In the over-modulation PWM control mode, the amplitude of each of the three-phase sinusoidal command voltages is greater than that of the carrier signal, so that a line-to-line voltage output from the inverter 20 to be applied to the motor-generator 30 has a distorted sinusoidal waveform.

The control apparatus 40 is configured to perform the current-feedback control that performs on-off operations of the switching elements S*# based on the measured and/or estimated values of the three-phase currents flowing in the motor-generator 30, which are fed back from the motor-generator 30. This current-feedback control results in control of the amplitude and phase of a line-to-line voltage to be applied to the motor-generator 30.

In contrast, when the modulation factor m is set to 1.27, the control apparatus 40 selects the rectangular control mode. In the rectangular control mode, the control apparatus 40 applies a rectangular AC voltage for each phase as a corresponding line-to-line rectangular voltage to the motor-generator 30. Specifically, an on-off pulse pattern of the switching elements S*# is designed such that the ratio of on duration to an off duration for each of the switching elements S*# of the inverter 20 are set to 1:1. In the rectangular control mode, the amplitude of a line-to-line voltage to be applied to the motor-generator 30 is fixed, so that the control apparatus 40 is configured to perform torque-feedback control. The torque-feedback control controls the phase of the rectangular AC voltage for each phase based on a difference between estimated torque Trqe fed back from the motor-generator 30 and the request torque Trq*.

FIG. 3 schematically illustrates a relationship between the control modes including corresponding feedback control methods and operating conditions, which include the output torque and the rotational speed Nr, of the motor-generator 30.

In the motor-generator 30, an increase of the rotational speed Nr and/or the output torque of the motor-generator 30 causes a voltage, i.e. a back electromotive force, induced in the motor-generator 30 to increase, resulting in an increase of a voltage required to drive the motor-generator 30. Thus, it is necessary to increase the system voltage VH to be higher than the voltage required to drive the motor-generator 30. Preferably, the control apparatus 40 is configured to switch the control mode for the inverter 20 from the sinewave PWM control mode to the over-modulation control mode and further from the over-modulation control mode to the rectangular control mode when the system voltage VH becomes a predetermined maximum voltage. This configuration improves the modulation factor m.

As schematically illustrated in FIG. 3, the control apparatus 40 is configured to select 1. The sinewave PWM control mode as the control mode for the inverter 20 when the rotational speed Nr of the motor-generator 30 is within a low-speed range I in order to reduce torque variations 2. The over-modulation control mode as the control mode for the inverter 20 when the rotational speed Nr of the motor-generator 30 is within a middle-speed range II higher than the low-speed range I in order to improve motor output 3. The rectangular control mode as the control mode for the inverter 20 when the rotational speed Nr of the motor-generator 30 is within a high-speed range III higher than the middle-speed range II in order to further improve motor output.

Particularly, selection of the rectangular control mode when the rotational speed Nr of the motor-generator 30 is within the high-speed range III improves output, i.e. output torque, of the motor-generator 30 (see FIG. 3).

Next, the following describes how the control apparatus 40 performs a PWM control mode including the sinewave PWM control mode and the over-modulation PWM control mode first, and describes how the control apparatus 40 performs the rectangular control mode next.

PWM Control Mode

The control apparatus 40, which is performing the PWM control mode, uses the V- and W-phase currents Iv and Iw fed back from the motor-generator 30 as the feedback controlled variables for performing the current-feedback control.

Figure 4:
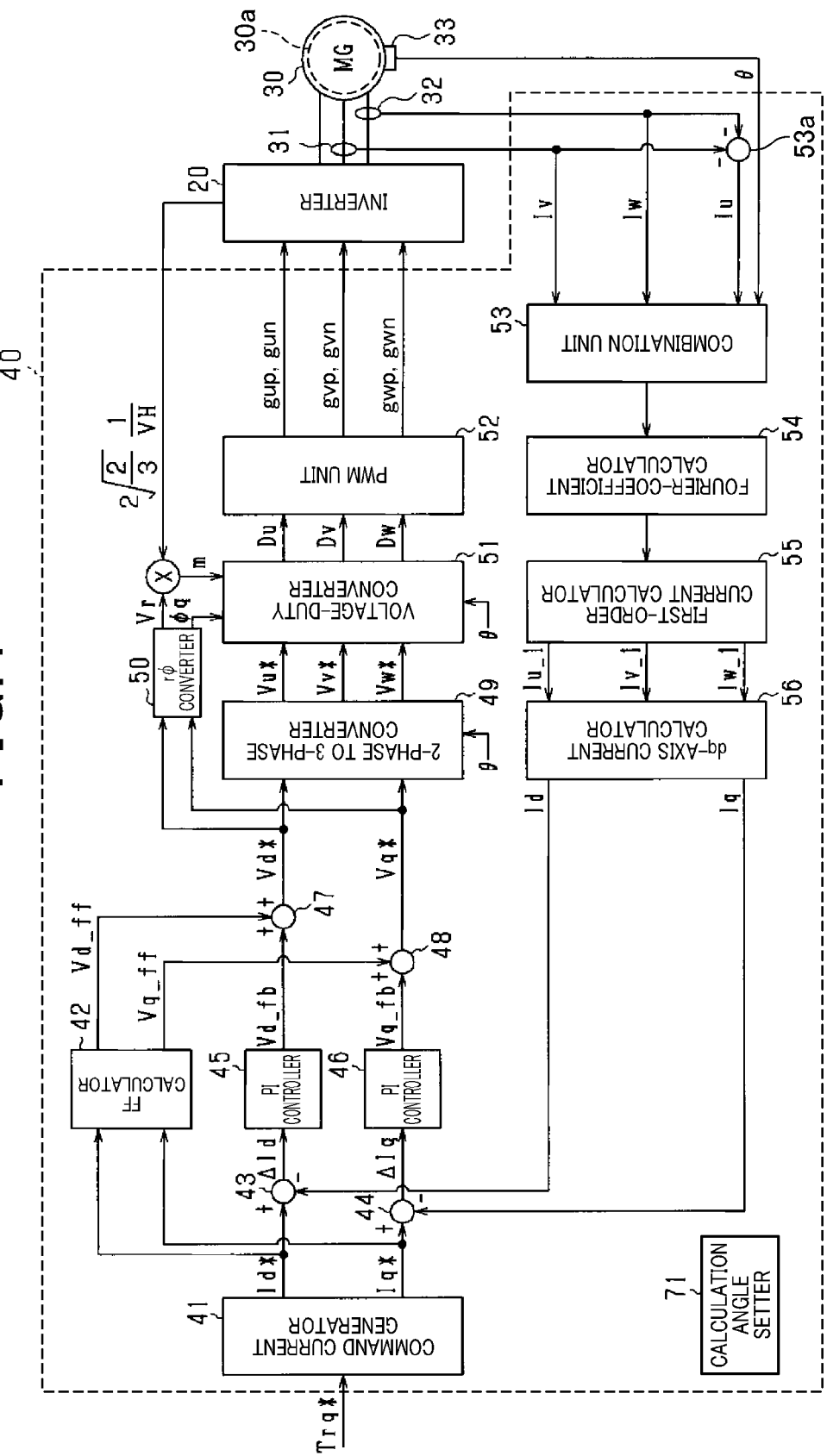
FIG. 4 is a schematic functional block diagram of the control apparatus for carrying out a PWM control mode according to the exemplary embodiment.

FIG. 4 schematically illustrates an example of the functional structure of the control apparatus 40 for carrying out the PWM control mode.

Specifically, the control apparatus 40 includes a command current generator 41, a feedforward (FF) calculator 42, a first deviation calculator 43, a second deviation calculator 44, a first PI controller 45, and a second PI controller 46. The control apparatus 40 includes a first adder 47, a second adder 48, a two-phase to three-phase converter 49, a rφ converter 50, a multiplier 50a, a voltage-duty converter 51, and a PWM unit 52. The control apparatus 40 also includes a calculator 53a, a combination unit 53, a Fourier-coefficient calculator 54, a first-order current, i.e. primary current, calculator 55, and a dq-axis current calculator 56. The two-phase to three-phase converter 49 is simply illustrated in FIG. 4 as 2-PHASE TO 3-PHASE.

The modules included in the control apparatus 40 cooperatively operate to carry out the current-feedback control. The modules can be implemented as hardware modules, software modules, and/or hardware-software hybrid modules.

The command current generator 41 is operative to generate a command d-axis current Id* and a command q-axis current Iq* in the d-q coordinate system of the rotor of the motor-generator 30 based on the value of the request torque Trq* supplied from the vehicle controller 100 and a current command map M1. The command d-axis current Id* and a command q-axis current Iq* are required to obtain torque of the motor-generator 30 matching with the value of the request torque Trq*.

The map M1, which is stored in the memory of the control apparatus 40, has a data-table format, a mathematical expression format, and/or a program format. The map includes information indicative of a relationship between values of each of the command d-axis current Id* and the command q-axis current Iq*, and values of the request torque Trq*. Specifically, the command current generator 41 refers to the map M1, and extracts a value of each of the command d-axis current Id* and the command q-axis current Iq* corresponding to the input value of the request torque Trq*. Note that a d-axis current and a q-axis current will also be simply described as d-q axis currents hereinafter. In addition, note that current vectors described hereinafter represent current vectors in the d-q coordinate system of the rotor of the motor-generator 30.

The feedforward calculator 42 is operative to calculate, based on the d-q axis command currents Id* and Iq*, a feedforward term Vd_ff of the command d-axis voltage and a feedforward term Vq_ff of the command q-axis voltage using, for example, predetermined information. The predetermined information represents a relationship between values of the d-q axis command currents Id* and Iq* and corresponding values of the feedforward terms Vd_ff and Vq_ff of the command d-q axis voltages. An example of how the feedforward calculator 42 calculates the feedforward term Vd_ff of the command d-axis voltage and the feedforward term Vq_ff of the command q-axis voltage is described in detail in U.S. Ser. No. 14/095,987. The applicant of the U.S. Ser. No. 14/095,987 filed on Dec. 3, 2013 corresponding to Japanese Patent Applications 2012-264210 and 2013-050474 is the same as this application. The disclosure of the U.S. patent application is incorporated entirely herein by reference.

The first deviation calculator 43 is operative to subtract a d-axis current value Id fed back from the d-q axis current calculator 56 from the command d-axis current Id* to thereby calculate an actual d-axis deviation ΔId. The second deviation calculator 44 is operative to subtract an actual q-axis current value Iq fed back from the d-q axis current calculator 56 from the command q-axis current Iq* to thereby calculate a q-axis deviation ΔIq.

The first PI controller 45 is operative to perform a PI operation using the d-axis deviation ΔId as input data, and a proportional gain term and an integral gain term of a PI feedback control algorithm (PI algorithm), thus calculating a feedback term Vd_fb of a command d-axis voltage such that the d-axis deviation ΔId converges to zero. The second PI controller 46 is operative to perform a PI operation using the q-axis deviation ΔIq as input data, and a proportional gain term and an integral gain term of the PI feedback control algorithm, thus calculating a feedback term Vq_fb of a command q-axis voltage such that the q-axis deviation ΔIq converges to zero.

The first adder 47 is operative to add the feedforward term Vd_ff of the command d-axis voltage to the feedback term Vd_fb of the command d-axis voltage, thus calculating the command d-axis voltage in the d-q coordinate system represented as Vd*. The second adder 48 is operative to add the feedforward term Vq_ff of the command q-axis voltage to the feedback term Vq_fb of the command q-axis voltage, thus calculating the command q-axis voltage in the d-q coordinate system represented as Vq*. Note that the actual d- and q-axis currents Id and Iq respectively serves as controlled variables for performing the current-feedback control.

To the two-phase to three-phase converter 49, the command d-axis voltage Vd* and command q-axis voltage Vq* calculated by the respective first and second adders 47 and 48, and the rotational position θ of the rotor of the motor-generator 30 measured by the rotational position sensor 33 are input.

Then, the two-phase to three-phase converter 49 converts the command d-axis voltage Vd* and command q-axis voltage Vq* into three-phase command voltages Vu*, Vv*, and Vw* in the three-phase fixed coordinate system using the rotational position θ of the rotor and, for example, map data or equation data. The map data or equation data represents correlations between values of the three-phase command voltages Vu*, Vv*, and Vw*, values of the command d-axis voltage Vd* and command q-axis voltage Vq*, and values of the rotational position θ of the rotor.

The rφ converter 50 is operative to convert the command d-axis voltage Vd* and command q-axis voltage Vq* into a command voltage vector; the command voltage vector has the magnitude Vr, and the phase difference φq with respect to the q-axis in the d-q coordinate system. Note that the anticlockwise direction of the phase difference φq with respect to the q-axis in the d-q coordinate system is set to a positive direction of the phase difference φq. The clockwise direction of the phase difference φq with respect to the q-axis in the d-q coordinate system is therefore set to a negative direction of the phase difference φq.

The multiplier 50a is operative to calculate the modulation factor m using the system voltage VH input to the inverter 20, the magnitude Vr of the command voltage vector calculated by the rφ converter 50, and the equation [1] set forth above.

The voltage-duty converter 51 is operative to convert the three-phase command voltages Vu*, Vv*, and Vw* into command duties Du, Dv, and Dw using the rotational position θ of the rotor, the phase difference φq, and the modulation factor m obtained by the multiplier 50a.

The PWM unit 52 is operative to calculate, based on the command duties Du, Dv, and Dw, drive signals gup, gun, gvp, gvn, gwp, and gwn for the respective switching elements Sup, Sun, Svp, Svn, Swp, and Swn of the inverter 20. Each of the drive signals gup, gun, gvp, gvn, gwp, and gwn is a pulse signal with a controllable duty cycle (controllable pulse width) for a corresponding switching cycle. The drive pulses gup, gun, gvp, gvn, gwp, and gwn are required for the motor-generator 30 to generate three-phase voltages Vu, Vv, and Vw corresponding to the respective three-phase command voltages Vu*, Vv*, and Vw*.

The FF calculator 42, first deviation calculator 43, second deviation calculator 44, first PI controller 45, second PI controller 46, first adder 47, second adder 48, two-phase to three-phase converter 49, rφ converter 50, multiplier 50a, voltage-duty converter 51, and PWM unit 52 serve as, for example, a driver in the PWM control mode. The driver is configured to drive the switching elements S*# of the inverter 20.

That is, the control apparatus 40 is operative to perform on-off operations of the switching elements Sup, Sun, Svp, Svn, Swp, and Swn of the inverter 20 based on the respective drive pulses gup, gun, gvp, gvn, gwp, and gwn, thus generating the three-phase voltages Vu, Vv, and Vw as output of the inverter 20. The three-phase voltages Vu, Vv, and Vw are applied to the motor-generator 30, so that the motor-generator 30 is driven based on the three-phase voltages Vu, Vv, and Vw to generate torque matching with the value of the request torque Trq* while the three-phase currents Iu, Iv, and Iw are flowing through the respective windings Wu, Wv, and Ww.

As described above, the control apparatus 40 obtains the V- and W-phase currents Iv and Iw measured by the respective current sensors 31 and 32, and calculates the U-phase current Iu accordingly. Then, the control apparatus 40 calculates the actual d-axis current value Id and the actual q-axis current value Iq based on the U-, V-, and W-phase currents Iu, Iv, and Iw. The control apparatus 40 is operative to feed the actual d-axis current value Id and the actual q-axis current value Iq back to the respective first and second deviation calculators 43 and 44.

Under control of drive of the motor-generator 30, higher-order components may be superimposed on at least one of the three-phase currents Iu, Iv, and Iw, or there may be a problem of phase-current offset for at least one of the three-phase currents Iu, Iv, and Iw. As described above, the phase-current offset for, for example, the V-phase current Iv is that the middle point of the peak-to-peak amplitude of the V-phase current Iv is offset with respect to the reference level of 0 [A].

If the d-q axis current values Id and Iq obtained based on the U-, V-, and W-phase currents Iu, Iv, and Iw, at least one of which contains higher-order components were fed back to the respective first and second deviation calculators 43 and 44, higher-order components might be superimposed on the command duties Du, Dv, and Dw. This might cause higher-order noise to be contained in noise caused by the switching operations of the switching elements S*#, resulting in adverse effects the motor-generator system 1 in quietness. Particularly, the over-modulation control mode may cause harmonics to be contained in the PWM pulses, so that harmonics are likely to be contained in at least one of the U-, V-, and W-phase currents Iu, Iv, and Iw, resulting in greater noise.

Phase-current offset occurring at least one of the U-, V-, and W-phase currents Iu, Iv, and Iw might cause torque variations and/or power fluctuation. Torque variations caused from the control apparatus 40 for the motor-generator 30 installed in the hybrid vehicle HVE might result in a problem of vibration of the hybrid vehicle HVE. Power fluctuation caused from the control apparatus 40 for the motor-generator 30 installed in at least one of the U-, V-, and W-phase currents Iu, Iv, and Iw might result in a problem of change in the power-supply current and voltage of the hybrid vehicle HVE. The latter problem might cause adverse effects on electrical components, which are installed in the hybrid vehicle HVE and operate based on the power-supply current and voltage.

In order to address these problems, the control apparatus 40 is operative to expand at least one phase current measured by the current sensor 31 or 32 as Fourier series that are functions of the rotational position θ of the rotor.

The following describes general expressions of Fourier coefficients, which are represented as the following equations [2], and a general expression of Fourier series expansion is represented as the following equation [3]:

$$\begin{cases} a_n = \frac{1}{\pi} \int_{-\pi}^{\pi} f(\theta) \cos n\theta \, d\theta, n = 0, 1, 2, \ldots \\ b_n = \frac{1}{\pi} \int_{-\pi}^{\pi} f(\theta) \sin n\theta \, d\theta, n = 0, 1, 2, \ldots \end{cases} \quad [2]$$

$$f(\theta) = \frac{a_0}{2} + \sum_{n=1}^{\infty} (a_n \cos n\theta + b_n \sin n\theta) = \frac{a_0}{2} + a_1 \cos \theta + a_2 \cos 2\theta + a_3 \cos 3\theta + \cdots \quad [3]$$

$$= b_1 \sin \theta + b_2 \sin 2\theta + b_3 \sin 3\theta + \cdots$$

Where $f(\theta)$ represents a periodic function of θ with one period 2π (360°), which is represented as the sum of trigonometric functions, $a_n$ represents a nth-order Fourier coefficient of cosine function, and $b_n$ represents an nth-order Fourier coefficient of sine function.

Note that reference character n included in each of the equations [2] is used only in the corresponding equation independently from reference character n used in the other sections of the specification.

Additionally, note that $$\frac{a_0}{2}$$

in the equation [3], which represents a zeroth order component, i.e. a DC component, in other words, represents an offset of the middle point of the peak-to-peak amplitude of a corresponding phase current with respect to the reference level of 0 [A]. The high-order components equal to or higher than the second-order components represent harmonics.

Specifically, the control apparatus 40 is configured to extract a first-order component of the Fourier series of the at least one phase current to thereby eliminate the higher-order components from a corresponding phase current. Then, the control apparatus 40 is configured to calculate a current vector, i.e. a d-axis current value Id and a q-axis current value Iq of the current vector, based on the first-order component of the at least one phase current, thus performing the current feedback control.

Note that usual control apparatus divides k period(s) of the electrical rotational angle of the rotor by N to obtain N calculation angles where k is a positive integer variable equal to or larger than 1, and N is a positive integer variable. Then, the usual control apparatus calculates a pair of first-order Fourier coefficients for the at least one phase current based on N measured values of the at least one phase current at the respective N calculation angles.

Figure 5:
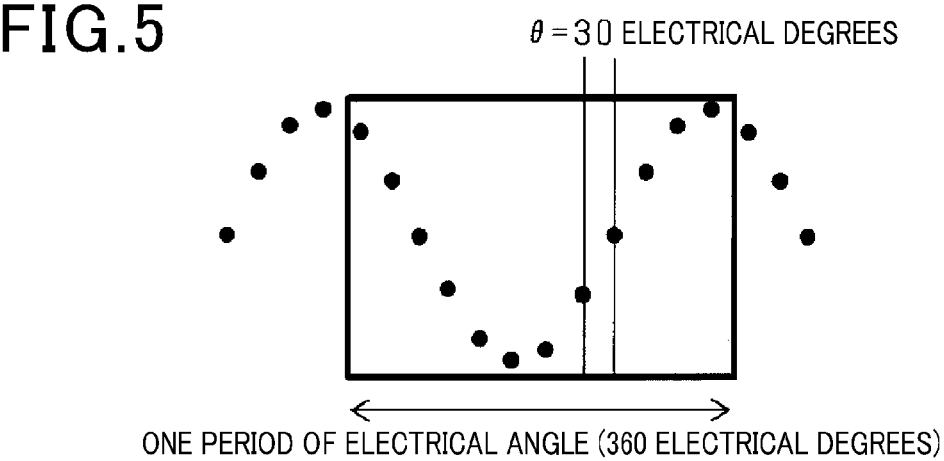
FIG. 5 is a diagram schematically illustrating an example of calculation angles used for the Fourier-coefficient calculation process.

For example, as illustrated in FIG. 5, if k is set to 1 and N is set to 12, the usual control apparatus divides one period, i.e. 360 electrical degrees (360°), of the electrical rotational angle of the rotor by 12 to obtain twelve integration angles. That is, the usual control apparatus calculates a pair of first-order Fourier coefficients for the at least one phase current based on a presently measured value of the at least one phase current at a present calculation angle and other eleven values of the at least one phase current at the last eleven calculation angles. That is, each of the calculation angles represents a start timing of calculating the pair of first-order Fourier coefficients. The current sensors 31 and 32 measure values of the respective V- and W-phase currents Iv and Iw in synchronization with each time the rotor rotates to reach one of the calculation angles.

Figure 6:
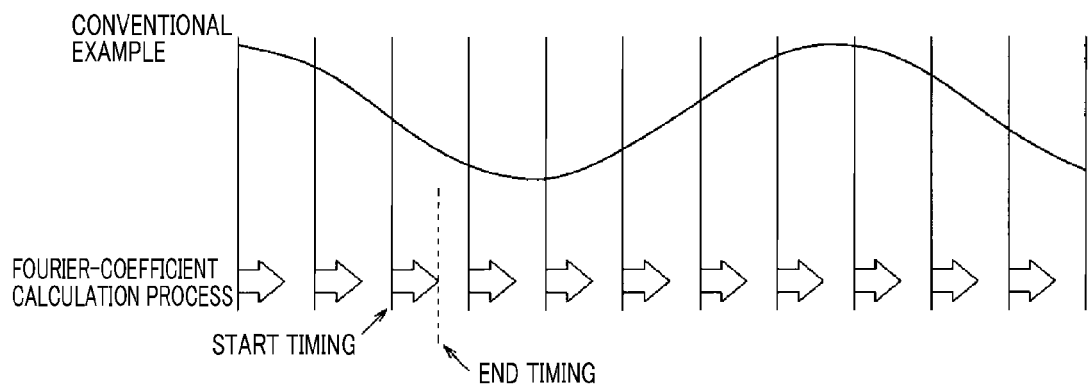
FIG. 6 is a timing chart schematically illustrating conventional calculation angles at each of which the Fourier-coefficient calculation process for at least one phase current is started.

FIG. 6 schematically illustrates a plurality of conventional calculation angles at each of which the above Fourier-coefficient calculation process for at least one phase current is started. That is, the starting point of each arrow represents a corresponding start timing of the Fourier-coefficient calculation process for at least one phase current, and the ending point of each arrow represents a corresponding end timing of the Fourier-coefficient calculation process for at least one phase current. The length of each arrow from the starting point to the ending point represents the time of the Fourier-coefficient calculation process.

FIG. 6 shows that the Fourier-coefficient calculation process for at least one phase current, which is started at a calculation angle, will be ended before the occurrence of the next calculation angle.

Increasing the number N, by which the k period(s) of the electrical rotational angle of the rotor is divided, to shorten the obtaining intervals, i.e. sampling intervals, between the successive calculation angles results in an increase of the number of the successive calculation angles within the k period(s). This improves the calculation accuracy of Fourier-coefficient calculation process for at least one phase current. In other words, shortening the intervals between the successive calculation angles to increase the number of sampled values of at least one phase current enables the calculation accuracy of Fourier-coefficient calculation process for the at least one phase current to be improved.

Unfortunately, there is a limit of the processing capacity of the control apparatus 40.

Figure 7:
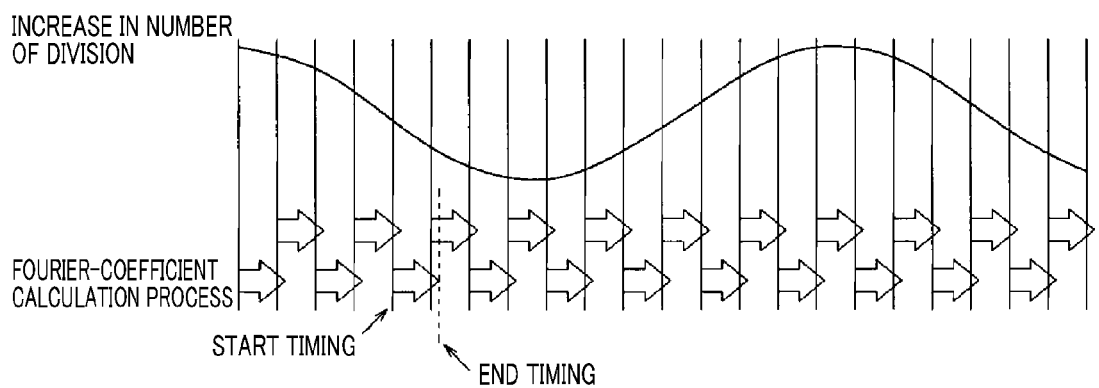
FIG. 7 is a timing chart schematically illustrating successive calculation angles, the number of which is more than the number of the calculation angles illustrated in FIG. 6.

FIG. 7 schematically illustrates successive calculation angles like FIG. 6 while the number N, by which the k period(s) of the electrical rotational angle of the rotor is divided, is twice the corresponding number N illustrated in FIG. 6 to reduce the intervals of the successive calculation angles to be half the intervals of the successive calculation angles illustrated in FIG. 6.

FIG. 7 shows the situation where the number N is increased over an upper limit defined based on the limited processing capacity of the control apparatus 40. In this case, before the Fourier-coefficient calculation process for at least one phase current, which is started at a calculation angle, is terminated, the next Fourier-coefficient calculation process for the at least one phase current might be started. This might result in difficulty of improvement of the calculation accuracy of the Fourier-coefficient calculation process for at least one phase current even with an increase of the number N over its upper limit.

On the other hand, the three-phase currents Iu, Iv, and Iw are shifted by the electrical angle of $2\pi/3$ radian, i.e. 120 electrical degrees, in phase from each other. For example, the U-phase current Iu is shifted by the electrical angle of 120 degrees in the advance direction with respect to the V-phase current Iv, and the W-phase current Iw is shifted by the electrical angle of 120 degrees in the delay direction with respect to the V-phase current Iv. Shifting the U-phase current Iu by the electrical angle of 120 degrees in the delay direction enables the shifted U-phase current Iu to match with the V-phase current Iv. Similarly, Shifting the W-phase current Iw by the electrical angle of 120 degrees in the advance direction enables the shifted W-phase current Iw to match with the V-phase current Iv.

On the basis of the characteristics of the three-phase currents Iu, Iv, and Iw, the control apparatus 40 according to the exemplary embodiment is configured to (1) Select one of the three phases of the motor-generator 30 as a reference phase (2) Hold a value of the reference phase current at each calculation angle (3) Shift values of the other two-phase currents at the corresponding calculation angle by electrical angle of 120 degrees (4) Superimpose, on the value of the reference phase current at each calculation angle, the shifted values of the other two-phase currents at the corresponding calculation angle.

This increases the number of values of at least one phase current to be used for the Fourier-coefficient calculation process for the at least one phase current.

The following describes how the control apparatus 40 calculates the pair of first-order Fourier coefficients for the V-phase current Iv, which is selected as the reference-phase current according to the exemplary embodiment. Note that U-phase current Iu or W-phase current Iw can be selected as the reference-phase current.

The control apparatus 40 includes a calculation angle setter 71 as illustrated in FIG. 4. The calculation angle setter 71, which serves as, for example, an interval setter, determines, as a sampling interval, an electrical angle that is a submultiple of (k×360°) and is unequal to a submultiple of 120° for the k period(s) of the electrical angle of each phase current. Then, the calculation angle setter 71 sets the calculation angles such that the calculation angles have the sampling intervals therebetween. For example, if k is set to 1, the calculation angle setter 71 determines, as the sampling interval, the electrical angle that is a submultiple of 360° and is not a submultiple of 120° for one period, i.e. 360°, of the electrical angle of each phase current. The equation $(9°\times2^j)$ can be used as an example of the value of the electrical angle that is a submultiple of 360° and is not a submultiple of 120° for the period of the electrical angle of each phase current; j is an integer variable equal to or more than 0 and equal to or less than 3.

Figure 8A:
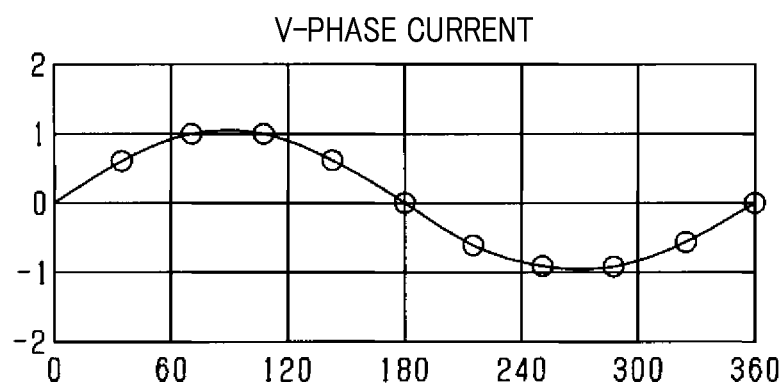
FIG. 8A is a graph schematically illustrating calculation angles for a V-phase current during one period of the electrical angle of the V-phase current.
Figure 8B:
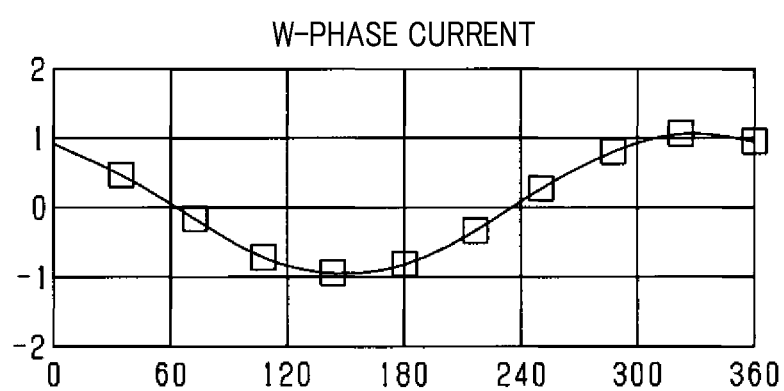
FIG. 8B is a graph schematically illustrating calculation angles for a W-phase current during one period of the electrical angle of the W-phase current.

FIG. 8A schematically illustrates, by using circular symbols, the calculation angles for the V-phase current during one period, i.e. 360 electrical degrees, of the electrical angle of the V-phase current. Similarly, FIG. 8B schematically illustrates, by using square symbols, the calculation angles for the U-phase current during one period of the electrical angle of the U-phase current. Additionally, FIG. 8C schematically illustrates, by using triangular symbols, the calculation angles for the W-phase current during one period of the electrical angle of the W-phase current.

Figure 8C:
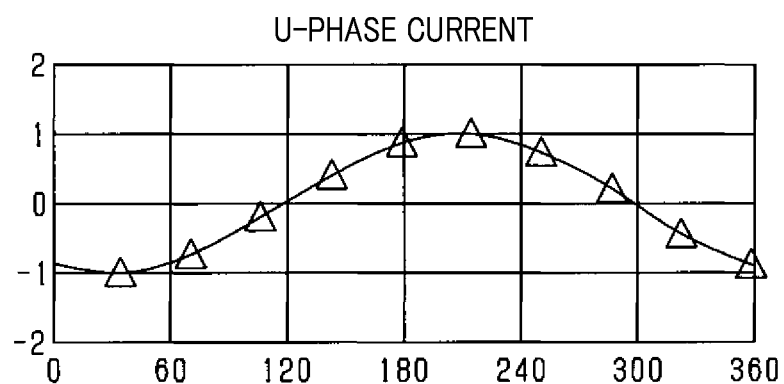
FIG. 8C is a graph schematically illustrating calculation angles for a W-phase current during one period of the electrical angle of the W-phase current.

FIGS. 8A to 8C show that the sampling intervals are set to 36 electrical degrees (36°), i.e. j is set to 2, and the calculation angles for each phase current are set to 36°, 72°, 108°, 144°, 180°, 216°, 252°, 288°, 324°, and 360°, the total number of which is ten.

The calculation angle setter 71 is capable of changing the value of j in the equation $(9°\times2^j)$ depending on the rotational speed of the rotor of the motor-generator 30 and/or the processing capacity of the control apparatus 40.

Specifically, the calculation angle setter 71 can be configured to reduce the value of j to shorten the sampling intervals with a decrease of the rotational speed of the rotor of the motor-generator 30. It is desirable that the sampling intervals within a lower rotational-speed range of the motor-generator 30 are set to be shorter than the sampling intervals within a higher rotational-speed range of the motor-generator 30. This is because the time required by one-period rotation of the rotor within the lower rotational-speed range of the motor-generator 30 is longer than the time required by one-period rotation of the rotor within the higher rotational-speed range of the motor-generator 30.

Additionally, the calculation angle setter 71 can be configured to adjust the value of j such that the higher processing capacity of the control apparatus 40 is, the smaller the value of j to shorten the sampling intervals is.

For example, the calculation angle setter 71 sets the equation ($9°×2^j$) to a value using a map M2 in data-table format, in mathematical expression format, and/or program format. The map M2 includes a function, i.e. correlation, between values of the equation ($9°×2^j$), values of the rotational speed of the motor-generator 30, and values of the processing capacity of the control apparatus 40. The calculation angle setter 71 retrieves, from the map M2, a value of the equation ($9°×2^j$) corresponding to a present value of the rotational speed of the motor-generator 30 and the value of the processing capacity of the control apparatus 40. Then, the calculation angle setter 71 sets the retrieved value of the equation ($9°×2^j$) as the electrical angle of the sampling intervals.

Note that the reason why the sampling interval is set to the electrical angle that is a submultiple of 360° if k is set to 1 is that the number of sampled values of each phase current is kept unchanged independently of any calculation angle at which the Fourier-coefficient calculation process is carried out. Additionally, the reason why the sampling interval is set to the electrical angle that is not a submultiple of 120° if k is set to 1 is that a calculation angle of another phase, which is shifted by 120 electrical angle with respect to the reference phase, is prevented from being equal to a calculation angle of the reference phase. If a calculation angle of another phase, which is shifted by 120 electrical angle with respect to the reference phase, were equal to a calculation angle of the reference phase, the number of sampled values of the reference phase current after the above superimposing process is identical to the number of sampled values of the reference phase current before the above superimposing process.

For example, if the sampling interval is set to 30 electrical degrees) (30°) that is a submultiple of 120°, the calculation angles for each phase current are set to 30°, 60°, 90°, 120°, 150°, 180°, 210°, 240°, 270°, 300°, 330°, and 360°.

In this case, shifting a value of the U-phase current at the calculation angle 30° by 120° in the delay direction enables the shifted value to be manipulated as a value of the V-phase current at the calculation angle 270°. Unfortunately, because the sampling point of the V-phase current at the calculation angle 270° is an original sampling point of the V-phase current, superimposing the shifted value of the U-phase current at the calculation angle 270° on the V-phase current does not contribute to an increase of the number of sampling points of the V-phase current. Much the same is true in each of sampling points of the U-phase current other than the sampling point at the calculation angle 30°. In addition, shifting a value of the W-phase current at the calculation angle 30° by 120° in the advance direction enables the shifted value to be manipulated as a value of the V-phase current at the calculation angle 150°. Unfortunately, because the sampling point of the V-phase current at the calculation angle 150° is an original sampling point of the V-phase current, superimposing the shifted value of the W-phase current at the calculation angle 150° on the V-phase current does not contribute to an increase of the number of sampling points of the V-phase current. Much the same is true in each of sampling points of the W-phase current other than the sampling point at the calculation angle 30°.

In contrast, let us consider that the sampling interval is set to 36 electrical degrees (36°) that is not a submultiple of 120 electrical degrees (120°).

In this desirable example, shifting a value of the U-phase current at the calculation angle 36° by 120° in the delay direction enables the shifted value to be manipulated as a value of the V-phase current at the calculation angle 276°. Because there are no original sampling points of the V-phase current at the calculation angle 276°, superimposing the shifted value of the U-phase current at the calculation angle 276° on the V-phase current contributes to an increase of the number of sampling points of the V-phase current. Much the same is true in each of sampling points of the U-phase current other than the sampling point at the calculation angle 36°. In addition, shifting a value of the W-phase current at the calculation angle 36° by 120° in the advance direction enables the shifted value to be manipulated as a value of the V-phase current at the calculation angle 156°. Because there are no original sampling points of the V-phase current at the calculation angle 156°, superimposing the shifted value of the W-phase current at the calculation angle 156° on the V-phase current contributes to an increase of the number of sampling points of the V-phase current. Much the same is true in each of sampling points of the W-phase current other than the sampling point at the calculation angle 36°.

The calculator 53a is operative to calculate the U-phase current Iu using the V- and W-phase currents Iv and Iw measured by the respective current sensors 32 and 33 in accordance with Kirchhoff's law.

The combination unit 53 is operative to (1) Shift a value of the U-phase current Iu at each of the calculation angles set by the calculation angle setter 71 by 120° in the delay direction (2) Combine the shifted value of the U-phase current Iu at each of the calculation angles set by the calculation angle setter 71 to the V-phase current Iv as the reference phase current (3) Shift a value of the W-phase current Iw at each of the calculation angles set by the calculation angle setter 71 by 120° in the advance direction (4) Combine the shifted value of the W-phase current Iw at each of the calculation angles set by the calculation angle setter 71 to the V-phase current Iv as the reference phase current.

This results in final values of the V-phase current Iv to be obtained; the final values of the V-phase current Iv include original sampled values of the V-phase current Iv, the shifted values of the U-phase current Iii, and the shifted values of the W-phase current Iw.

Figures 9, 10:
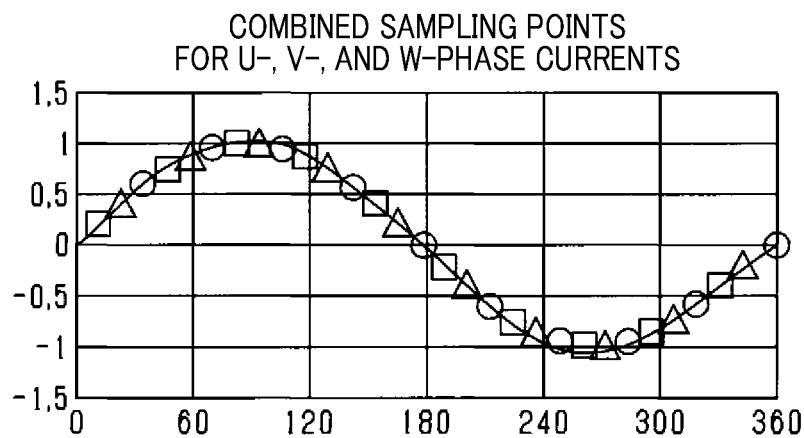
FIG. 9 is a graph schematically illustrating the combination of the calculation angles for the V-phase current (see FIG. 8A), the calculation angles for the W-phase current (see FIG. 8B), which are shifted by 120 electrical degrees in the advance direction, and the calculation angles for the U-phase current (see FIG. 8C), which are shifted by 120 electrical degrees in a delay direction.
FIG. 10 is a table schematically illustrating the original calculation angles for the V-phase current, the calculation angles for the W-phase current, which are shifted by 120 electrical degrees in the advance direction, and the calculation angles for the U-phase current, which are shifted by 120 electrical degrees in the delay direction.

FIG. 9 schematically illustrates that (1) The original sampling points, which is represented as the circular symbols, of the V-phase current illustrated in FIG. 8A (2) The sampling points of the W-phase current, which is obtained by shifting the original sampling points of the W-phase current illustrated as the square symbols in FIG. 8B by 120° in the advance direction (3) The sampling points of the U-phase current, which is obtained by shifting the original sampling points of the U-phase current illustrated as the square symbols in FIG. 8C by 120° in the delay direction.

Additionally, FIG. 10 illustrates (1) The electrical angles at the respective original sampling points of the V-phase current (2) The electrical angles at the respective sampling points of the W-phase current, which are shifted by 120° in the advance direction and are used to be combined to the V-phase current (3) The electrical angles at the respective sampling points of the U-phase current, which are shifted by 120° in the delay direction and are used to be combined to the V-phase current.

FIGS. 9 and 10 illustrate that the final sampling points of the V-phase current show values of the V-phase current at the respective electrical angles different from one another, and the number of the final sampling points of the V-phase current becomes three times the number of the original sampling points of the V-phase current.

This enables the number of sampling points of the V-phase current within one period of the electrical angle of the rotor, which becomes three times the number of original calculation angles within one period of the electrical angle of the rotor, to be obtained.

The Fourier-coefficient calculator 54 is configured to integrate values calculated based on the sampled values of the V-phase current at the respective final sampling points obtained by the combination unit 53 over the k period(s) of the electrical angle of the rotor, thus calculating the pair of the first-order Fourier coefficients for the V-phase current. The Fourier-coefficient calculator 54 according to the exemplary embodiment integrates values calculated based on the sampled values of the V-phase current at the respective final sampling points obtained by the combination unit 53 over one period of the electrical angle of the rotor, because k is set to 1 according to the exemplary embodiment.

Let us assume that a control apparatus in which no combination units are provided as a comparative control apparatus. In this assumption, it is possible for the control apparatus 40 to calculate the pair of the first-order Fourier coefficients for the V-phase current using the sampled values of the V-phase current. The calculation cycle of the pair of the first-order Fourier coefficients for the V-phase current by the control apparatus 40 is identical to the calculation cycle of the pair of the first-order Fourier coefficients for the V-phase current by the comparative control apparatus. However, the number of the sampled values of the V-phase current obtained by the control apparatus 40 is three times the number of sampled values of the V-phase current obtained by the comparative control apparatus.

Accordingly, the control apparatus 40 enables the calculation accuracy of the pair of the first-order Fourier coefficients for the V-phase current to be improved even if there is a limit of the processing capacity of the control apparatus 40.

The first-order current calculator 55 is operative to calculate first-order components $Iu\_1$, $Iv\_1$, and $Iw\_1$ for the respective phases based on the pair of the first-order Fourier coefficients for the V-phase current calculated by the Fourier-coefficient calculator 54.

Specifically, the first-order current calculator 55 is operative to calculate the first-order component $Iv\_1$ of the V-phase current based on the pair of the first-order Fourier coefficients $a_1$ and $b_1$ calculated by the Fourier-coefficient calculator 54. Then, the first-order current calculator 55 is operative to shift the first-order component $Iv\_1$ of the V-phase current by 120° in the advance direction, thus calculating the first-order component $Iu\_1$ of the U-phase current. Additionally, the first-order current calculator 55 is operative to shift the first-order component $Iv\_1$ of the V-phase current by 120° in the delay direction, thus calculating the first-order component $Iw\_1$ of the W-phase current.

The d-q-axis current calculator 56 is operative to convert the first-order components $Iu\_1$, $Iv\_1$, and $Iw\_1$ in the three-phase fixed coordinate system into the d- and q-axis current values Id and e Iq in the d-q coordinate system. The d- and q-axis current values Id and Iq are fed back to the respective first and second deviation calculators 43 and 44 described above.

Figure 11:
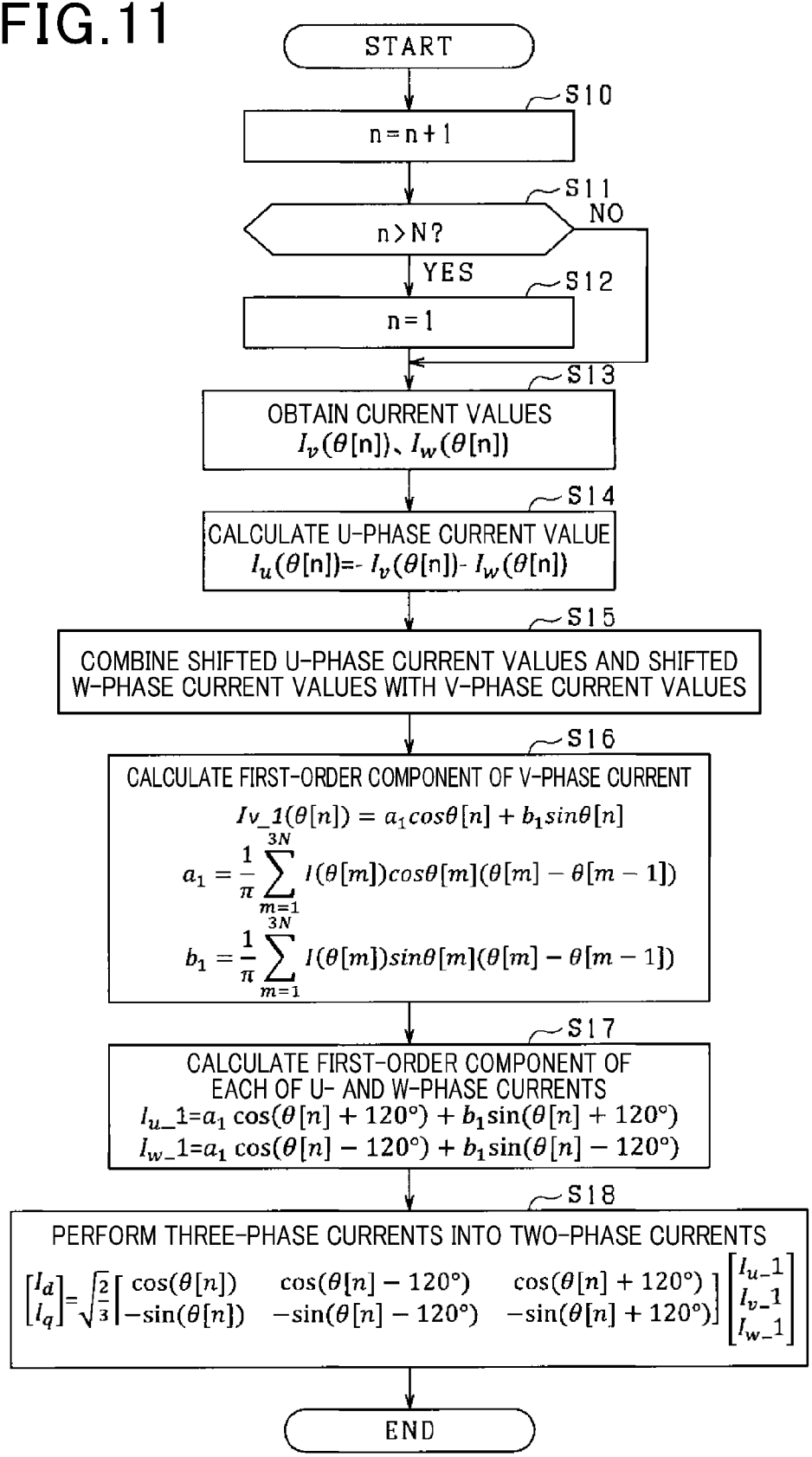
FIG. 11 is a flowchart schematically illustrating an example of a dq-axis current calculation routine carried out by the control apparatus.

The following describes how the control apparatus 40 calculates the d- and q-axis current values Id and Iq from the V-phase current Iv measured by the current sensor 31 with reference to FIGS. 11 and 12.

Figure 12A:
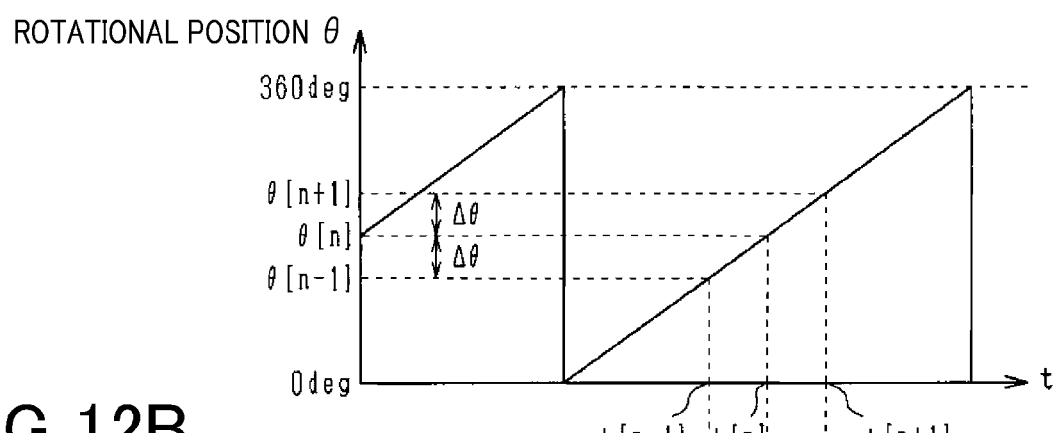
FIG. 12A is a graph schematically illustrating how the rotational position of the rotor of the motor-generator changes over time.
Figure 12B:
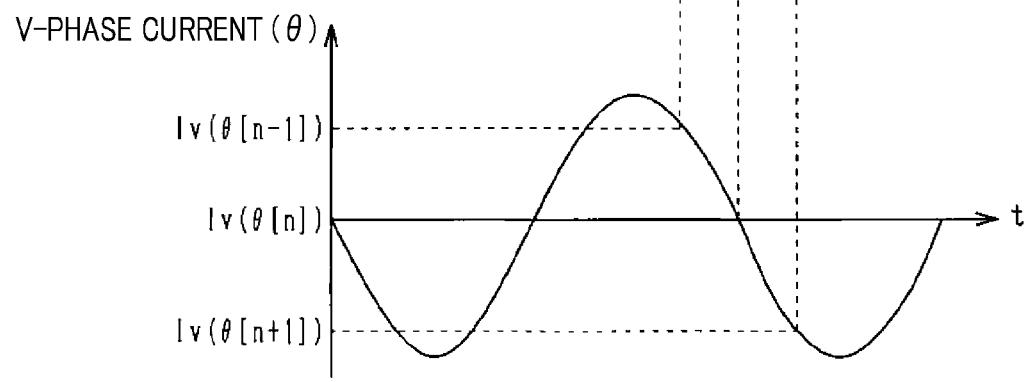
FIG. 12B is a graph schematically illustrating how the V-phase current changes over time.

FIG. 12A is a graph schematically illustrating how the rotational position θ of the rotor of the motor-generator 30 changes over time (t), and FIG. 12B schematically illustrates how the V-phase current Iv (θ), which is a function of the rotational position θ, changes over time (t).

FIG. 12A shows that the rotational position θ changes in the form of saw-tooth wave such that the rotational position θ linearly rises in proportion to time, and returns to 0° when reaching 360°. The vertical axis of the graph of FIG. 12A represents the (n−1)th calculation angle θ[n−1], the nth calculation angle θ[n], and the (n+1)th calculation angle θ[n+1]. The sampling intervals Δθ between the successive calculation angles are each set to the constant value, represented by the equation $\Delta\theta = 9° \times 2^j$. That is, dividing one period 360° of the electrical angle of the rotor equally by N represented by the equation $N=360/\Delta\theta$ obtains the value of each of the sampling intervals. Thus, the calculation angles θ[1] to θ[N] within one period 360° of the electrical angle of the rotor are set; θ[N] is equal to θ[0]. In the successive first and second periods of the electrical angle of the rotor, the rotational position θ of the rotor at the calculation angle θ[0] in the second period is identical to the rotational position θ of the rotor at the calculation angle θ[360] in the first period. That is, the N calculation angles θ[1] to θ[N] within each period 360° of the electrical angle of the rotor are set.

The horizontal axis of the graph of FIG. 12A represents calculation start timings t(n) each triggered by a corresponding one of the calculation angles θ[n]. The intervals between the calculation start timings t(n) are equal to each other, because the corresponding sampling intervals are set to be equal to each other.

FIG. 12B shows values Iv(θ[n−1]), Iv(θ[n]), and Iv(θ[n+1]) of the V-phase current Iv corresponding to the respective calculation angles θ[n−1], θ[n], and θ[n+1].

The following describes a dq-axis current calculation routine, which is carried out by the control apparatus 40 for each of the calculation angles, for calculating the d- and q-axis current values Id and Iq from the V-phase current Iv measured by the current sensor 31 with reference to the flowchart of FIG. 11.

When executing a present cycle of the dq-axis current calculation routine, the control apparatus 40 increments a value of the variable n used in the last cycle of the dq-axis current calculation routine by 1 in step S10. The variable n is used for each of the calculation angles θ[n]. Next, the control apparatus 40 determines whether the value of the variable n exceeds N representing the last calculation angle θ[N] in step S11. Upon determining that the value of the variable n is equal to or less than N (NO in step S11), the control apparatus 40 executes the operation in step S13. Otherwise, upon determining that the value of the variable n exceeds N (YES in step S11), the control apparatus 40 sets the variable n to 1 in step S12, and executes the operation in step S13.

In step S13, the control apparatus 40 serves as, for example, an obtaining unit to obtain, i.e. sample, the value Iv(θ[n]) of the V-phase current Iv measured by the current sensor 31, and obtain, i.e. sample, the value Iw(θ[n]) of the W-phase current Iw measured by the current sensor 32. The sampled value Iv(θ[n]) of the V-phase current Iv and the sampled value Iw(θ[n]) of the W-phase current Iw respectively represent values of the V- and W-phase currents Iv and Iw at the calculation angle θ[n].

Subsequently, the control apparatus 40 calculates a value Iu(θ[n]) of the U-phase current Iu using the sampled values Iv(θ[n]) and Iw(θ[n]) in accordance with Kirchhoff's law in step S14.

Following the operation in step S14, the control apparatus 40 performs the following operations. First, the control apparatus 40 selects the V-phase as the reference phase. Next, the control apparatus 40 selects N recently sampled values of each of the U-, V-, and W-phase currents Iu, Iv, and Iw at the present and previous N calculation angles θ[n], θ[n−1], θ[n−2], . . . . Then, the control apparatus 40 shifts the selected N recently sampled values of the U-phase current Iu by 120° in the delay direction, and combines the shifted sampled values of the U-phase current Iu to the selected N recently sampled values of the V-phase current Iv. Additionally, the control apparatus 40 shifts the selected N recently sampled values of the W-phase current Iw by 120° in the advance direction, and combines the shifted sampled values of the W-phase current Iw to the selected N recently sampled values of the W-phase current Iw.

This results in 3N sampled values of the V-phase current Iv within one period of the electrical angle of the rotor being obtained.

Following the operation in step S15, the control apparatus 40 calculates the pair of the first-order Fourier coefficients $a_1$ and $b_1$ in accordance with the following equations [4] in step S16:

$$\begin{cases} a_1 = \frac{1}{\pi} \sum_{m=1}^{3N} I(\theta[m]) \cos \theta[m](\theta[m] - \theta[m-1]) \\ b_n = \frac{1}{\pi} \sum_{m=1}^{3N} I(\theta[m]) \sin \theta[m](\theta[m] - \theta[m-1]) \end{cases} \quad [4]$$

Note that discretizing the equations [2] and [3] obtains the equations [4]. The sampled values I(θ[m]) (m=1, 2, . . . , 3N) are comprised of the combination of the original N sampled values of the V-phase current, the shifted N sampled values of the U-phase current, and the shifted N sampled values of the W-phase current. The electrical angles θ[m] are comprised of the combination of the original calculation angles θ[n](n=1, 2, . . . , N), the calculation angles {θ[n]−120} (n=1, 2, . . . , N), and the calculation angles {θ[n]+120} (n=1, 2, . . . , N), which are arranged in the sequential order.

That is, in step S16, the control apparatus 40 integrates I(θ[m])cos θ[m](θ[m]−θ[m−1]) from m=1 to m=3N, thus calculating the first-order Fourier coefficient $a_1$. Similarly, in step S16, the control apparatus 40 integrates I(θ[m])sin θ[m](θ[m]−θ[m−1]) from m=1 to m=3N, thus calculating the first-order Fourier coefficient $b_1$.

Then, in step S16, the control apparatus 40 calculates the first-order component Iv_1 of the V-phase current based on the pair of the first-order Fourier coefficients $a_1$ and $b_1$ in accordance with the following equation [5]:

$$Iv\_1(\theta[n]) = a_1 \cos \theta[n] + b_1 \sin \theta[n] \quad [5]$$

Note that I(θ[m]) (m=1, 2, . . . , 3N) serve as, for example, values of the reference phase current. I(θ[m])cos θ[m](θ[m]−θ[m−1]) and I(θ[m])sin θ[m](θ[m]−θ[m−1]) serve as, for example, function values based on the values of the reference phase current.

Following the operation in step S16, the control apparatus 40 shifts the first-order component Iv_1 of the V-phase current by the electrical angle of 120° in the advance direction in accordance with the following equation [6], thus calculating the first-order component Iu_1 of the U-phase current in step S17:

$$Iu\_1(\theta[n]) = a_1 \cos(\theta[n]) + 120° + b_1 \sin(\theta[n]) + 120°) \quad [6]$$

In step S17, the control apparatus 40 shifts the first-order component Iv_1 of the V-phase current by the electrical angle of 120° in the delay direction in accordance with the following equation [7], thus calculating the first-order component Iw_1 of the W-phase current in step S17:

$$Iw\_1(\theta[n]) = a_1 \cos(\theta[n] - 120°) + b_1 \sin(\theta[n] - 120°) \quad [7]$$

Subsequently, the control apparatus 40 converts the first-order component Iv_1 of the V-phase current, the first-order component Iv_1 of the V-phase, and the first-order component Iw_1 of the W-phase current into the d- and q-axis current values Id and e Iq in the d-q coordinate system in accordance with the following equation [8]:

$$\begin{bmatrix} I_d \\ I_q \end{bmatrix} = \sqrt{\frac{2}{3}} \begin{bmatrix} \cos \theta[n] & \cos(\theta[n] - 120°) & \cos(\theta[n] + 120°) \\ -\sin \theta[n] & -\sin(\theta[n] - 120°) & -\sin(\theta[n] + 120°) \end{bmatrix} \begin{bmatrix} Iu\_1 \\ Iv\_1 \\ Iw\_1 \end{bmatrix} \quad [8]$$

Rectangular Control Mode

The control apparatus 40, which is performing the rectangular control mode, uses torque of the motor-generator 30 as the feedback controlled variable for performing the torque-feedback control.

Figure 13:
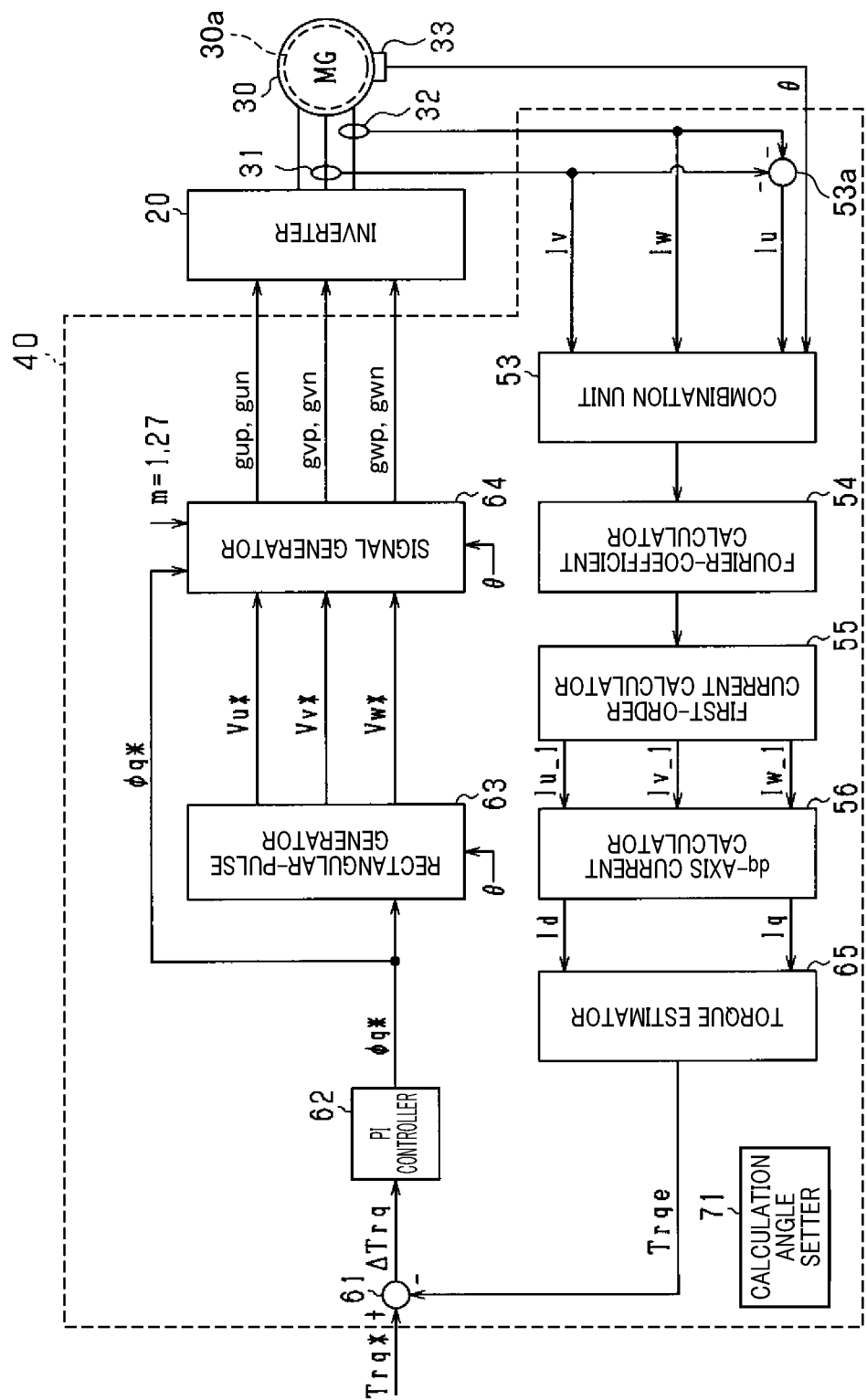
FIG. 13 is a schematic functional block diagram of the control apparatus for carrying out a rectangular control mode according to the exemplary embodiment.

FIG. 13 schematically illustrates an example of the functional structure of the control apparatus 40 for carrying out the rectangular control mode.

Specifically, the control apparatus 40 includes a deviation calculator 61, a PI controller 62, a rectangular-pulse generator 63, and a signal generator 64. The control apparatus 40 also includes the calculation angle setter 71, the combination unit 53, the Fourier-coefficient calculator 54, the first-order current calculator 55, the d-q-axis current calculator 56, and a torque estimator 65. The functions of the respective units 71, 53, 54, 55, and 56 in the rectangular control mode are substantially identical to the functions of the units 71, 53, 54, 55, and 56 in the PWM control mode. The detailed descriptions of the units 71, 53, 54, 55, and 56 illustrated in FIG. 13 are therefore omitted.

The deviation calculator 61 is operative to subtract the estimated torque Trqe estimated by the torque estimator 65 described later from the request torque Trq* supplied from the vehicle controller 100 to thereby calculate a torque deviation ΔTrq between the estimated torque Trqe and the request torque Trq*. The estimated torque Trqe represents an estimated value of actual torque generated by the motor-generator 30.

The PI controller 62 is operative to perform a PI operation using the torque deviation ΔTrq as input data, and a proportional gain term and an integral gain term of a PI feedback control algorithm (PI algorithm), thus calculating the voltage phase command φq* such that the torque deviation ΔTrq converges to zero. This causes the torque estimated torque Trqe to follow the request torque Trq*. Note that the estimated torque Trqe serves as the controlled variable in the rectangular control mode, and the request torque Trq* serves as a target value of the controlled variable.

The rectangular-pulse generator 63 is operative to generate, based on the voltage phase command φq* and the rotational position θ of the rotor, rectangular U-, V-, and W-phase voltage commands Vu*, Vv*, and Vw*, i.e. U-, V-, and W-phase voltage command pulses Vu*, Vv*, and Vw*.

The signal generator 64 is operative to generate the drive signals gup, gun, gvp, gvn, gwp, and gwn for the respective switching elements Sup, Sun, Svp, Svn, Swp, and Swn of the inverter 20 in accordance with the rotational position θ, the modulation factor m set to 1.27, and the three-phase voltage commands Vu*, Vv*, and Vw*. The signal generator 64 is also operative to output the drive signals gup, gun, gvp, gvn, gwp, and gwn to the respective switching elements Sup, Sun, Svp, Svn, Swp, and Swn.

That is, the control apparatus 40 is operative to perform on-off operations of the switching elements Sup, Sun, Svp, Svn, Swp, and Swn of the inverter 12 based on the respective drive pulses gup, gun, gvp, gvn, gwp, and gwn, thus generating three-phase voltages Vu, Vv, and Vw as output of the inverter 20. The three-phase voltages Vu, Vv, and Vw are applied to the motor-generator 30, so that the motor-generator 30 is driven based on the three-phase voltages Vu, Vv, and Vw to generate torque matching with the value of the request torque Trq*.

The deviation calculator 61, PI controller 62, rectangular-pulse generator 63, and signal generator 64 serve as, for example, a driver in the rectangular control mode.

The torque estimator 65 is operative to obtain the estimated torque Trqe based on the d- and q-axis current values Id and Iq input from the d-q-axis current calculator 56.

For example, the torque estimator 65 obtains the estimated torque Trqe using, for example, a map M3 in data-table format, in mathematical expression format, and/or program format. The map M3 includes a function, i.e. correlation, between values of the estimated torque Trqe with respect to pairs of the d- and q-axis current values Id and Iq. The torque estimator 65 retrieves a value of the estimated torque Trqe corresponding to the pair of the d- and q-axis current values Id and Iq in the map M3. Then, the torque estimator 65 feeds back the value of the estimated torque Trqe to the deviation calculator 61.

The control apparatus 40 includes, for example, the first functional structure for performing the PWM control mode, and the second functional structure for performing rectangular control mode. The control apparatus 40 can be configured to switchably select one of the first functional structure for performing the PWM control mode, and the second functional structure for performing rectangular control mode in accordance with the value of the modulation factor m obtained by the multiplier 50a.

As described above, the motor-generator system 1 including the control apparatus 40 according to the exemplary embodiment is configured to 1. Select one of the U-, V-, and W-phase currents as the reference phase current 2. Shift values of each of the remaining two phase currents, i.e. the other two phase currents, at the respective calculation angles by 120° in the advance or delay direction 3. Combine the shifted values of each of the remaining two phase currents to values of the reference phase current.

This configuration enables the number of combined values of the reference phase current used to calculate the pair of the first-order Fourier coefficients to be three times greater than the number of original values of the reference phase current obtained by the comparison configuration that uses merely the original values of the reference phase current while maintaining the calculation cycle of the pair of the first-order Fourier coefficients unchanged.

This configuration therefore efficiently improves the calculation accuracy of the first-order component of each phase current even if there is a limit of the processing capacity of the control apparatus 40.

In particular, the control apparatus 40 is configured to set the sampling intervals for sampling values of the reference phase current to the electrical angle defined by the equation $(9°×2^j)$ where j is an integer variable equal to or more than 0 to equal to or less than 3. This configuration enables the sampling intervals to be reliably a submultiple of $(k×360°)$ and not a submultiple of 120° for the k period(s) of the electrical angle of the reference phase current. This configuration enables the sampling points of the reference phase current to differ from the shifted sampling points of the other phase currents combined to the reference phase current. This results in an increase of the number of the sampled values of the reference phase current.

Additionally, the control apparatus 40 is configured to change the value of j in the equation $(9°×2^j)$ to adjust the sampling intervals accordingly. For example, the control apparatus 40 is configured to change the value of j in the equation $(9°×2^j)$ depending on the rotational speed of the rotor of the motor-generator 30 and/or the processing capacity of the control apparatus 40. This configuration adjusts the sampling intervals to be suitable for a present value of the rotational speed of the rotor of the motor-generator 30 and/or the processing capacity of the control apparatus 40.

The control apparatus 40 is configured to

1. Calculate the first-order component of the reference phase current based on the calculated pair of the first-order Fourier coefficients for the reference phase current 2. Shift the first-order component of the reference phase current by 120 electrical degrees in the advance direction to calculate the first-order component of one of the remaining two phase currents 3. Shift the first-order component of the reference phase current by 120 electrical degrees in the delay direction to calculate the first-order component of the other of the remaining two phase currents.

This configuration eliminates the need to execute the Fourier-coefficient calculation process for each of the remaining two phase currents, thus reducing the processing load of the control apparatus 40.

The exemplary embodiment of the present disclosure can be freely modified within the scope of the present disclosure.

The control apparatus 40 can be configured to combine the shifted values of any one of the remaining two phase currents to values of the reference phase current. This modified configuration also enables the number of combined values of the reference phase current used to calculate the pair of the first-order Fourier coefficients to be two times greater than the number of original values of the reference phase current obtained by the comparison configuration that uses merely the original values of the reference phase current.

This modified configuration therefore efficiently improves the calculation accuracy of the first-order component of each phase current even if there is a limit of the processing capacity of the control apparatus 40.

The motor-generator system 1 can be configured such that current sensors are provided to the output leads of the respective U-, V-, and W-phase windings Wu, Wv, and Ww. In this modified configuration, the current sensors measure the respective U-, V-, and W-phase currents Iu, Iv, and Iw, and output the measured values of the U-, V-, and W-phase currents Iu, Iv, and Iw to the control apparatus 40. At that time, the control apparatus 40 can sample the value Iu(θ[n]) of the U-phase current Iu, the value Iv(θ[n]) of the V-phase current Iv, and the value Iw(θ[n]) of the W-phase current Iw, which are measured by the respective current sensors in step S13 of the dq-axis current calculation routine. This modified configuration therefore eliminates the operation in step S14 of the dq-axis current calculation routine.

The control apparatus 40 can be configured to set the sampling intervals for sampling values of the reference phase current to an electrical angle that is a submultiple of 360° and is defined by the equation (9°×i) where i is a positive integer variable. For example, 45 electrical degrees (45°), which is a submultiple of 360° and satisfies the equation (9°×i) where i=5, can be set as the sampling intervals.

In this modified configuration, the calculation angle setter 71 can set the equation (9°×i) to a value using a map M3 in data-table format, in mathematical expression format, and/or program format. The map M3 includes a function, i.e. correlation, between values of the equation (9°×i), values of the rotational speed of the motor-generator 30, and values of the processing capacity of the control apparatus 40. The calculation angle setter 71 can retrieve, from the map M3, a value of the equation (9°×i) corresponding to a present value of the rotational speed of the motor-generator 30 and the value of the processing capacity of the control apparatus 40. Then, the calculation angle setter 71 can set the retrieved value of the equation (9°×i) as the electrical angle of the sampling intervals.

The measuring timings of the phase current by each of the current sensors 31 and 32 are synchronized with the corresponding calculation angles θ(n) according to the exemplary embodiment, but the present disclosure is not limited thereto.

Specifically, the measuring timings of the phase current by each of the current sensors 31 and 32 can be asynchronous with the corresponding calculation angles θ(n). In this modification, the control apparatus 40 can perform linear interpolation between the measured values of each of the V- and W-phase currents to calculate values of the corresponding current at the sampling timings of the respective calculation angles θ(n) in step S13. Then, the control apparatus 40 can use the calculated values at the sampling timings of the respective calculation angles θ(n) for calculating the pair of the first-order Fourier coefficients for the reference phase current in the following steps S14 to S18.

While the illustrative embodiment of the present disclosure has been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for controlling switching elements of an inverter to control a three-phase alternating-current rotary electric machine in accordance with measured values of at least first and second phase currents in three-phase currents flowing in the alternating-current rotary electric machine, the apparatus comprising:
    an obtaining unit configured to obtain a value of each phase current based on the measured values of the at least first and second phase currents for each calculation angle of the alternating-current rotary electric machine, the calculation angles having intervals therebetween;
    an interval setter configured to set each of the intervals between the calculation angles to an electrical angle, the electrical angle being a submultiple of (k×360) electrical degrees and being unequal to a submultiple of 120 electrical degrees for at least one period of the electrical angle of the three-phase rotary electric machine where k represents the number of the at least one period and is a positive integer variable;
    a combination unit configured to:
        select one of the three-phase currents as a reference phase current;
        shift the captured values of at least one of the remaining two phase currents other than the reference phase current by 120 electrical degrees; and
        combine the shifted captured values of the at least one of the remaining two phase currents to the captured values of the reference phase current to obtain combined values of the reference phase current;
    a coefficient calculator configured to integrate, for each of the calculation angles, function values based on the combined values of the reference phase current over the at least one period of the electrical angle of the three-phase rotary electric machine to calculate a Fourier coefficient for the reference phase current;
    a first-order current calculator configured to calculate a first-order component of each phase current based on the calculated Fourier coefficient;
    a dq-axis current converter configured to convert the first-order currents of the respective phase currents into d-axis current value and a q-axis current value; and
    a driver configured to drive the switching elements of the inverter such that a value of a controlled variable based on the calculated d- and q-axis current values follows a target value of the controlled variable.

2. The apparatus according to claim 1, wherein the combination unit is configured to:
    shift the captured values of one of the remaining two phase currents by 120 electrical degrees in an advance direction with respect to the reference phase current;
    shift the captured values of the other of the remaining two phase currents by 120 electrical degrees in a delay direction with respect to the reference phase current; and
    combine the shifted captured values of each of the remaining two phase currents to the captured values of the reference phase current to obtain the combined values of the reference phase current.

3. The apparatus according to claim 1, wherein the interval setter is configured to set each of the intervals between the calculation angles to the electrical angle, the electrical angle being a submultiple of 360 electrical degrees and being equal to (9×i) electrical degrees.

4. The apparatus according to claim 2, wherein the sampling interval setter is configured to set each of the intervals between the calculation angles to the electrical angle, the electrical angle being a submultiple of 360 electrical degrees and being equal to (9×i) electrical degrees.

5. The apparatus according to claim 3, wherein the interval setter is configured to set each of the intervals between the calculation angles to the electrical angle, the electrical angle being equal to $(9 \times 2^j)$ electrical degrees where j is an integer variable equal to or more than zero.

6. The apparatus according to claim 4, wherein the interval setter is configured to set each of the intervals between the calculation angles to the electrical angle, the electrical angle being equal to $(9 \times 2^j)$ electrical degrees where j is an integer variable equal to or more than zero.

7. The apparatus according to claim 5, wherein the interval setter is configured to change a value of the integer variable j depending on a rotational speed of the rotary electric machine.

8. The apparatus according to claim 6, wherein the interval setter is configured to change a value of the integer variable j depending on a rotational speed of the rotary electric machine.

9. The apparatus according to claim 1, wherein the first-order current calculator is configured to:
- calculate the first-order component of the reference phase current based on the calculated Fourier coefficient;
- shift the first-order component of the reference phase current by 120 electrical degrees in an advance direction to calculate the first-order component of one of the remaining two phase currents; and
- shift the first-order component of the reference phase current by 120 electrical degrees in a delay direction to calculate the first-order component of the other of the remaining two phase currents.

* * * * *